United States Patent
Sato et al.

(10) Patent No.: US 9,476,237 B2
(45) Date of Patent: Oct. 25, 2016

(54) OPENING-CLOSING DEVICE FOR OPENING IN VEHICLE

(71) Applicant: HONDA MOTOR CO., LTD., Tokyo (JP)

(72) Inventors: Hironobu Sato, Wako (JP); Kenichi Hori, Wako (JP); Shinsuke Kandaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/423,369

(22) PCT Filed: Aug. 23, 2013

(86) PCT No.: PCT/JP2013/072535
§ 371 (c)(1),
(2) Date: Feb. 23, 2015

(87) PCT Pub. No.: WO2014/034553
PCT Pub. Date: Mar. 6, 2014

(65) Prior Publication Data
US 2015/0300069 A1    Oct. 22, 2015

(30) Foreign Application Priority Data

Aug. 30, 2012 (JP) ................................ 2012-190302
Aug. 30, 2012 (JP) ................................ 2012-190354

(51) Int. Cl.
*E05F 1/10* (2006.01)
*B62D 25/12* (2006.01)
(Continued)

(52) U.S. Cl.
CPC ............ *E05F 1/1033* (2013.01); *B62D 25/12* (2013.01); *E05D 3/02* (2013.01); *E05F 3/20* (2013.01); *E05Y 2600/50* (2013.01); *E05Y 2600/53* (2013.01); *E05Y 2900/548* (2013.01)

(58) Field of Classification Search
CPC .. E05F 1/1033; E05F 3/20; E05Y 2900/548; E05Y 2600/50; E05Y 2600/53; E05D 5/062; E05D 3/02; B62D 25/12
USPC .................. 49/246, 339, 340, 341, 345, 346; 296/76, 146.11, 56
See application file for complete search history.

(56) References Cited

U.S. PATENT DOCUMENTS

| 4,188,684 A | * | 2/1980 | Pennec | ................... E05D 3/125 16/333 |
| 4,206,944 A | * | 6/1980 | Kumagai | .................. E05D 3/18 180/69.21 |

(Continued)

FOREIGN PATENT DOCUMENTS

| JP | 1-79775 U | 5/1989 |
| JP | 10-264657 A | 10/1998 |
| JP | 2010-254215 A | 11/2010 |

OTHER PUBLICATIONS

International Search Report dated Nov. 19, 2013 issued in corresponding application No. PCT/JP2013/072535.

(Continued)

*Primary Examiner* — Justin Rephann
(74) *Attorney, Agent, or Firm* — Westerman, Hattori, Daniels & Adrian, LLP

(57) ABSTRACT

An opening-closing device for an opening in a vehicle includes an opening-closing body for opening and closing an opening formed in a vehicle body, a hinge arm for supporting the opening-closing body in a swingable manner on the vehicle body, and a torsion bar for pressing the hinge arm in the direction in which the opening-closing body is opened. The device includes a slide rail section provided on the surface of the hinge arm, and a slider capable of sliding in the longitudinal direction of the hinge arm by being guided by the slide rail section. The slider is held in a state in which the slider is always in contact with the slide rail section in the direction in which the torsion bar presses. The torsion bar is connected to the slider.

20 Claims, 20 Drawing Sheets

(51) Int. Cl.
*E05D 3/02* (2006.01)
*E05F 3/20* (2006.01)

(56) References Cited

U.S. PATENT DOCUMENTS

| | | | | |
|---|---|---|---|---|
| 4,223,483 A * | 9/1980 | Stafford | E05D 15/42 | 49/250 |
| 4,402,111 A * | 9/1983 | Selby | E05F 1/1238 | 16/308 |
| 4,587,760 A * | 5/1986 | Brissette | E05D 3/18 | 16/288 |
| 4,776,626 A * | 10/1988 | Seyler | E05D 5/062 | 16/289 |
| 5,195,796 A * | 3/1993 | Wampler, II | E05D 3/18 | 16/358 |
| 5,419,012 A * | 5/1995 | Lewis | E05D 3/10 | 16/306 |
| 5,584,099 A * | 12/1996 | Westerdale | E05D 5/062 | 16/235 |
| 5,873,619 A * | 2/1999 | Lewkoski | E05D 7/0423 | 16/241 |
| 5,967,586 A * | 10/1999 | Duffy | E05D 7/0045 | 16/235 |
| 6,382,704 B1 * | 5/2002 | Nastasoiu | E05D 5/062 | 16/298 |
| 6,419,293 B1 * | 7/2002 | Nicholas | E05F 1/1033 | 296/76 |
| 6,568,033 B2 * | 5/2003 | Kim | E05D 5/062 | 16/334 |
| 7,594,301 B2 * | 9/2009 | Krajenke | E05D 7/0423 | 16/235 |
| 7,870,643 B2 * | 1/2011 | Krueger | E05F 1/1066 | 16/282 |
| 8,251,431 B2 * | 8/2012 | Nakazato | E05D 5/062 | 296/146.11 |
| 8,469,433 B2 * | 6/2013 | Krajenke | E05F 1/1238 | 296/146.11 |
| 8,500,185 B1 * | 8/2013 | Krajenke | E05F 1/1238 | 296/76 |
| 8,607,416 B2 * | 12/2013 | Krajenke | E05F 1/1238 | 16/297 |
| 8,863,359 B1 * | 10/2014 | Krajenke | E05D 5/062 | 16/286 |
| 2001/0030441 A1 * | 10/2001 | Wilde | E05F 15/619 | 296/76 |
| 2001/0054257 A1 * | 12/2001 | Wygle | E05F 15/619 | 49/349 |
| 2002/0002756 A1 * | 1/2002 | Sato | E05D 3/022 | 16/235 |
| 2006/0230578 A1 * | 10/2006 | Renke | E05D 5/062 | 16/289 |
| 2006/0279105 A1 * | 12/2006 | Renke | E05D 5/062 | 296/146.11 |
| 2007/0228763 A1 * | 10/2007 | Duffy | E05F 15/63 | 296/76 |
| 2008/0018131 A1 * | 1/2008 | Heath | E05D 5/062 | 296/76 |
| 2008/0084087 A1 * | 4/2008 | Duffy | E05F 1/1215 | 296/76 |
| 2009/0102225 A1 * | 4/2009 | Hanna | E05F 15/63 | 296/76 |
| 2009/0282648 A1 * | 11/2009 | Lee | E05D 5/062 | 16/297 |
| 2010/0275518 A1 | 11/2010 | Nakazato | | |
| 2011/0162282 A1 * | 7/2011 | Binder | E05F 1/1238 | 49/386 |
| 2013/0119698 A1 * | 5/2013 | Patzer | E05D 5/062 | 296/146.12 |
| 2013/0318745 A1 * | 12/2013 | Krajenke | E05F 1/1284 | 16/305 |

OTHER PUBLICATIONS

Notification of Transmittal of Translation of the International Preliminary Report on Patentability (Form PCT/IB/338) of International Application No. PCT/JP2013/072535 mailed Mar. 12, 2015 with Forms PCT/IB/373 and PCT/ISA/237(English translation).

* cited by examiner

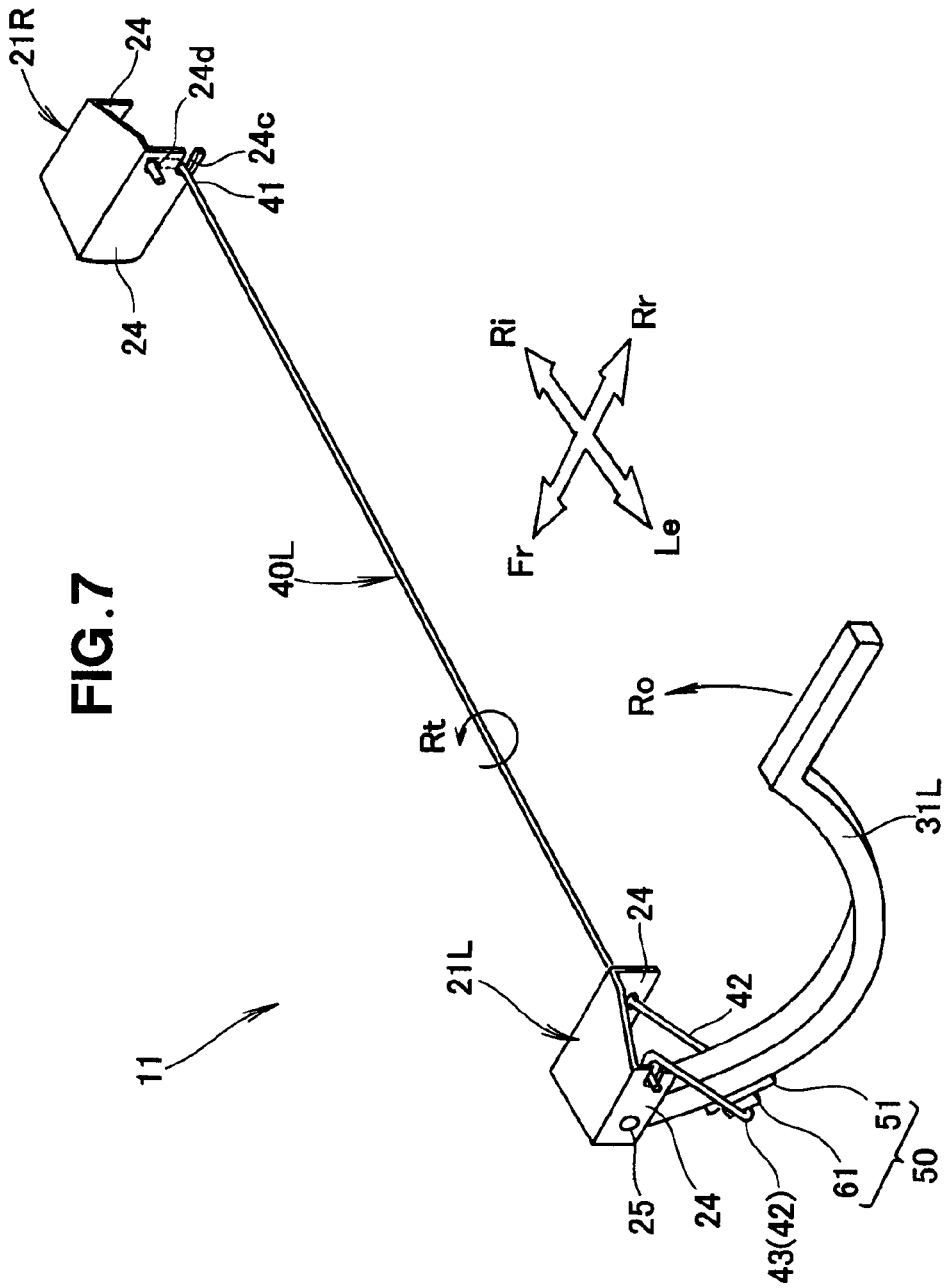

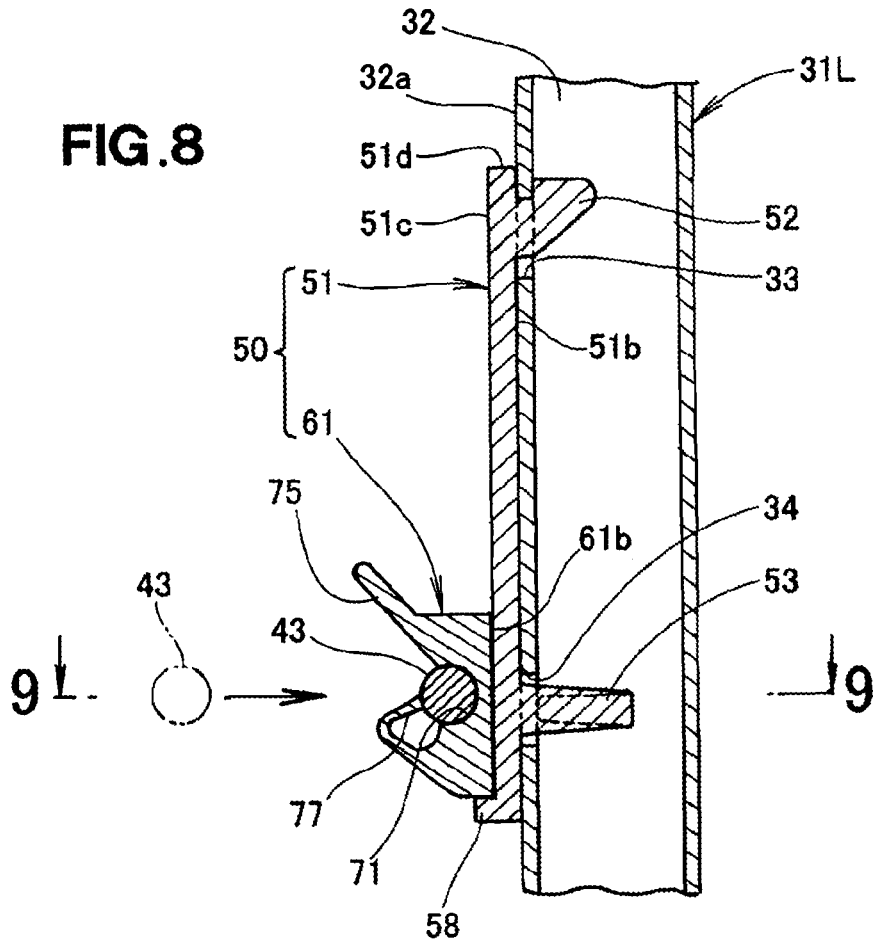
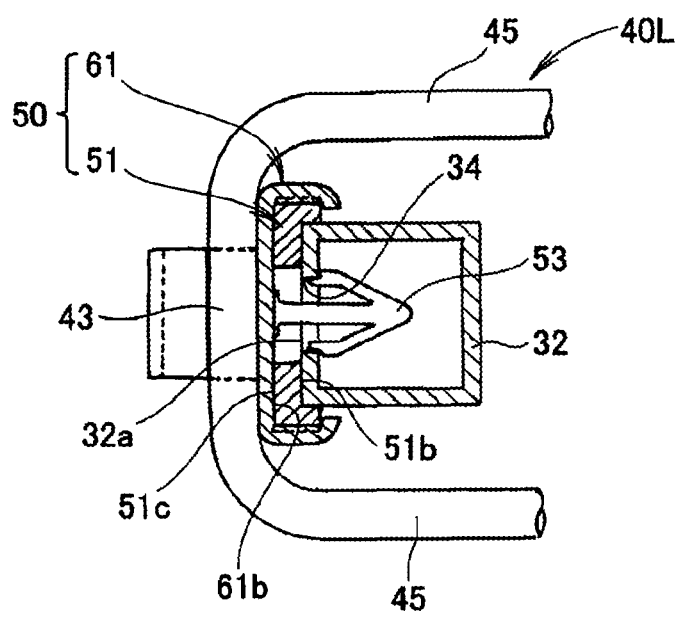

OPENING-CLOSING DEVICE FOR OPENING IN VEHICLE

TECHNICAL FIELD

The present invention relates to an improvement in an opening-closing device for an opening portion of a vehicle.

BACKGROUND ART

Vehicular opening-closing devices include opening-closing members for opening and closing a variety of openings of vehicles. The opening-closing device includes a trunk lid to open and close a trunk opening is known patent literature 1 below.

The opening-closing device disclosed in patent literature 1 includes a trunk opening formed in a rear part of a vehicle body, a trunk lid for opening/closing the trunk opening, a hinge arm through the trunk lid is swingably supported by the vehicle body, and a torsion bar urging the hinge arm in a direction to open the trunk lid.

More specifically, the torsion bar has one end connected to the vehicle body such that relative rotation of the one end to the vehicle body is limited. The torsion bar has an opposite end bent radially outwardly of the bar to form a generally crank-shaped configuration. The crank-shaped part has a distal end over which a resinous elastic pipe fits to be rotatable on a center of the pipe. The torsion bar has an urging force transmitted through the elastic pipe to the hinge arm, such that the hinge arm opens the trunk lid under the urging force.

When the torsion bar twists, the crank-shaped part twists in the same direction as the torsion bar. As a result, the elastic pipe fitting over the crank-shaped part can incline relative to the hinge arm. That is, the elastic pipe partially abuts on the hinge arm without uniformly contacting the hinge arm. For this reason, the urging force of the torsion bar acts on the hinge arm in a direction different from the direction to open the trunk lid. Such a phenomenon is obstructive to a smooth swing motion of the hinge arm and trunk lid. Additionally, the partial wear meaning that the elastic pipe partially wears, needs to be reduced as much as possible in order to improve the durability of the opening-closing device.

The trunk lid is preferably opened or closed at an optimal speed. To this end, a swing speed of the hinge arm needs to be set to an optimal value. Little or no sliding friction is produced between the hinge arm and the elastic pipe rotatably fitting over the torsion bar. Since the swing speed of the hinge arm depends on the urging force alone, the swing speed of the hinge arm is not necessarily set to the optimal value. To address this, it is thought that an additional mechanism for producing the friction force is newly provided in order to set the speed at which the trunk lid is opened or closed. However, the provision of such a mechanism is not expedient, because it increases the number of the parts of the device.

PRIOR ART LITERATURE

Patent Literature

Patent Literature 1: JP-U-1-079775

SUMMARY OF INVENTION

Technical Problem

An object of the present invention is to provide a technique for: improving durability of an opening-closing device for opening and closing an opening; smoothing a swing motion of an opening-closing member of the device; and optimizing a speed at which the opening-closing member is opened or closed.

Solution to Problem

According to one aspect of the present invention, as defined in claim 1, there is provided an opening-closing device for a vehicular opening portion, the device including an opening-closing member for opening and closing an opening portion formed in a vehicle body, a hinge arm through which the opening-closing member is swingably supported by the vehicle body, and a torsion bar urging the hinge arm in a direction in which the opening-closing member is opened, the device comprising: a slide rail section provided on a surface of the hinge arm; and a slider to be guided by the slide rail section to slide in a longitudinal direction of the hinge arm, the slider being held always in surface-to-surface contact with the slide rail section in an urging direction of the torsion bar, and the torsion bar being connected to the slider.

Preferably, as defined in claim 2, the slider includes a bar connecting opening, the torsion bar being connected to the bar connecting opening by fitting therein, and the bar connecting opening is opened in a direction opposite the direction in which the hinge arm is urged by the torsion bar.

Preferably, as defined in claim 3, the opening portion is provided by a trunk opening portion provided in a rear part of the vehicle body, and the opening-closing member is provided by a trunk lid for opening and closing the trunk opening portion. Further, the slide rail section is located on a front surface of an arm proximal end portion of the hinge arm, and the torsion bar has a support center located rearwardly of a swing center of the hinge arm in a rear direction of the vehicle body.

Preferably, as defined in claim 4, the slide rail section has a stopper defining a lowest position to which the slider is capable of being lowered relative to the slide rail section, and the lowest position is set either at a fully lowered position in which the slider is fully lowered in response to a swing motion of the arm proximal end portion, or at a position offset from the fully lowered position by a play allowing the slider to be further lowered from the fully lowered position.

Preferably, as defined in claim 5, the slider is in a position set above the fully lowered position relative to the slide rail section when the trunk lid is fully opened.

Preferably, as defined in claim 6, the stopper is provided by a locking projection formed on the slide rail section, and the slider has a locking portion formed thereon, the locking portion being lockable to the locking projection.

Preferably, as defined in claim 7, the slider is detachably provided on the slide rail section such that the slider is detachable from a side opposite the stopper.

Preferably, as defined in claim 8, the bar connecting opening is provided by a grooved portion extending in a direction perpendicular to a slide direction in which the slider slides relative to the slide rail section, and the grooved portion comprises a central part located at a center in a longitudinal direction of a groove of the grooved portion, and opposite end parts located on opposite sides of the central part in the longitudinal direction of the groove. Further, the central part is in the form of a straight groove parallel to the longitudinal direction of the groove, and the opposite end parts are in the form of taper grooves widening from the central part outwardly in the longitudinal direction of the groove.

Preferably, as defined in claim 9, the front surface of the arm proximal end portion has a first attachment hole located towards the swing center of the arm proximal end portion, and a second attachment hole located farther from the swing center than the first attachment hole. Further, the slide rail section is a member different from the arm proximal end portion in an overlapping relationship with the front surface of the arm proximal end portion, and the slide rail section has a generally L-shaped hook portion engaged with the first attachment hole, and a clip portion locked to the second attachment hole in a snap-fit manner.

Preferably, as defined in claim 10, the slider has a slide surface, and the slide rail section has a front surface on which the slide surface is slidable, the slide surface of the slider being held in slidable contact with the front surface of the slide rail section by an urging force of the torsion bar. Further, the slide rail section has a region where the slider is slidable, the region of the slide rail section has one part defining a friction force increasing portion to provide a large friction force between the friction force increasing portion and the slider.

Preferably, as defined in claim 11, the friction force increasing portion is formed by a raised surface defined by a portion of the front surface of the slide rail section, the portion of the front surface of the slide rail section being raised in a direction opposite the direction of the urging force of the torsion bar.

Preferably, as defined in claim 12, the slide rail section is provided by a generally flat-plate-shaped member, and the slider has a pair of arm portions each generally L-shaped from opposite edges of the slider extending in a direction of slide movement of the slide surface, such that the arm portions embrace edges of the slide rail section. Further, the pair of arm portions comprises a pair of extension parts and a pair of bent parts, the pair of extension parts extending from the slide surface of the slider, near the edges of the slide rail section and toward a back surface of the slide rail section, the pair of bent parts extending from distal ends of the extension parts along the back surface of the slide rail section toward each other. Furthermore, an interval from the slide surface of the slider to the pair of bent parts is set to be larger than a thickness of the slide rail section.

Preferably, as defined in claim 13, the interval is sized such that the pair of bent parts of the slider temporarily contacts the back surface of the slide rail section as the slide surface of the slider slides on the raised surface relative to the front surface of the slide rail section.

Preferably, as defined in claim 14, the slide surface of the slider has a bar position corresponding to a location to which the torsion bar is connected, the bar position being set to reach a location located immediately before an apex portion of the raised surface, when the pair of bent parts temporarily contacts the back surface of the slide rail section.

Preferably, as defined in claim 15, the apex portion of the raised surface is continuous with a flat surface on which the slide surface of the slider is slidable, the flat surface maintaining the same height from the apex portion, and the front surface of the slide rail section includes a surface other than the raised surface, the flat surface being parallel to the surface other than the raised surface.

Preferably, as defined in claim 16, the raised surface is adjacent to a stop position of the slider in which the opening-closing member is fully closed.

Advantageous Effects of Invention

Regarding the invention defined in claim 1, the slider is held always in the surface-to-surface contact with the slide rail section in the urging direction of the torsion bar. Thus, even if the torsion bar is connected to the slider while twisting and inclining relative to the slider, the slider can sufficiently maintain the surface-to-surface contact with the slide rail section. As a result, even if the torsion bar applies the urging force to the hinge arm in a direction somewhat different from the direction in which the opening-closing member is opened, the hinge arm and the opening-closing member can swing smoothly. In addition, occurrence of partial wear, meaning that a contact surface between the slide rail section and the slider partially wears, can be reduced as much as possible. As a result, the durability of the opening-closing device can be enhanced.

Further, in the invention defined in claim 1, a sliding friction is produced between the slide rail section and the slider. By appropriately setting the sliding friction force, a swing velocity of the hinge arm can be set to an optimal value. As a result, a velocity at which the opening-closing member is opened and closed can be easily set to an optimal velocity. Further, there is no need for a mechanism to produce a frictional force for setting the opening/closing velocity of the opening-closing member. As a result, the number of the parts can be reduced.

Regarding the invention defined in claim 2, the slider has the bar connecting opening to which the torsion bar is connected by fitting in the bar connecting opening. It is possible to easily assemble the torsion bar to the slider only by fitting the torsion bar in the bar connecting opening of the slider assembled to the slide rail section provided on the surface of the hinge arm. The bar connecting opening is opened in the direction opposite the direction in which the hinge arm is urged by the torsion bar. Once the torsion bar twisting in the direction opposite the urging direction is positioned in alignment with the bar connecting opening, the torsion bar automatically fits into the bar connecting opening under its own urging force. Thus, high quality of assemblage of the torsion bar to the slider assembled to the hinge arm is achieved. The torsion bar fitting in the bar connecting opening urges the hinge arm in the direction in which the opening-closing member is opened.

Regarding the invention defined in claim 3, the trunk lid pivots vertically between the open and closed positions for opening and closing the trunk opening portion of the vehicle. The arm proximal end portion of the hinge arm through which the trunk lid is supported on the vehicle body is attached to the vehicle body so as to swing in the front-rear direction. The support center of the torsion bar is located rearwardly of the swing center of the hinge arm in the rear direction of the vehicle body. The slide rail section is located on the front surface of the arm proximal end portion. The slider is guided by the slide rail section to slide in a longitudinal direction of the hinge arm. The slider is located in a lower part of the hinge arm when the trunk lid is opened.

The following steps are taken in assembling the torsion bar to the bar connecting opening of the slider. The slider assembled to the slide rail section automatically moves downwardly in response to the trunk lid being fully opened. The bar connecting opening having moved downwardly can be set in such a position as to allow the torsion bar to fit in the bar connecting opening. The torsion bar twisting in the direction opposite the urging direction automatically fits into the bar connecting opening under its own urging force. Thus, higher quality of assemblage of the torsion bar to the slider assembled to the hinge arm is achieved. Since the torsion bar is located close to the hinge arm, an available space in the trunk is large.

Regarding the invention defined in claim 4, the slide rail section has the stopper defining the lowest position to which the slider can be lowered. The slider is prevented from being further lowered from the lowest position. That is, the slider, which is lowered in response to the swing motion of the arm proximal end portion, is retained by the stopper in the lowest position. For this reason, high quality of assemblage of the slide rail section, the slider and the torsion bar is achieved.

Regarding the invention defined in claim 5, the slider is set higher than the fully lowered position relative to the slide rail section when the trunk lid is fully opened. Thus, the slider does not forcefully strike the stoppers even if the trunk lid is subjected to "over-stroke operation", that is, even if the trunk lid is opened further beyond the fully open position. Since the slider does not forcefully strike the stopper, the stopper increases its durability.

Regarding the invention defined in claim 6, the stopper is provided by the locking projection formed on the slide rail section. The slider has the locking portion formed thereon and lockable to the locking projection. By locking the locking portion to the locking projection, the slider is retained on the slide rail section. Thus, the slider can be provisionally assembled to the slide rail section to thereby achieve improved conveyance thereof to a subsequent process.

Regarding the invention defined in claim 7, the slider is detachably provided on the slide rail section located on the arm proximal end portion such that the slider is detachable from the side opposite the stopper. This allows the slider to be easily replaced with another slider for the slide rail section provided on the arm proximal end portion. That is, the replacement workability can be improved.

Regarding the invention defined in claim 8, the bar connecting opening is provided by the grooved portion extending in the direction perpendicular to the slide direction of the slider. The grooved portion comprises the straight groove located at the center in the longitudinal direction of the groove, and the taper grooves widening from opposite ends of the straight groove outwardly in the longitudinal direction of the groove. For this reason, the torsion bar is connected only to the straight groove if the torsion bar inclines relative to the grooved portion. That is, the inclined torsion bar does not contact only the longitudinal end parts of the grooved portion. For this reason, the bar connecting opening enhances its durability. Additionally, even if the torsion bar inclines relative to the grooved portion, the torsion bar can be borne by the straight groove alone. The torsion bar applies its urging force to a middle position in the longitudinal direction of the groove of the grooved portion. As a result, the inclination of the slider relative to the slide rail section is prevented to thereby allow the slider to slide more smoothly.

Regarding the invention defined in claim 9, the slide rail section is a member different from the arm proximal end portion. For this reason, the slide rail section is easier to produce than if the slide rail section is formed integrally with the large-sized arm proximal end portion. Further, the slide rail section has the hook portion and the clip portion. The hook portion is engaged with the first attachment hole located towards the swing center of the arm proximal end portion. The clip portion is locked in the snap-fit matter to the second attachment hole located farther from the swing center than the first attachment hole.

The urging direction in which the urging force is applied from the torsion bar to the bar connecting opening is not perpendicular to the slide direction in which the slider slides relative to the slide rail section. For this reason, a force often acts on an upper part of the slide rail section (located toward the swing center) in a direction away from the arm proximal end portion. In view of this, in the invention of claim 9, the upper part of the slide rail section has the hook portion. The hook portion can be locked more steadily than the clip portion. Thus, the attachment of the slide rail section to the arm proximal end portion can be sufficiently maintained.

Regarding the invention defined in claim 10, the slide surface of the slider is held in slidable contact with the front surface of the slide rail section by the urging force of the torsion bar. Thus, a sliding friction force is produced between the slide surface and the front surface of the slide rail section. By appropriately setting the sliding friction force, a swing velocity of the hinge arm can be set to an optimal value. As a result, a velocity at which the opening-closing member is opened and closed can be easily set to an optimal velocity. Further, there is no need for a mechanism to produce a frictional force for setting the opening/closing velocity of the opening-closing member. As a result, the number of the parts can be reduced.

Further, the slide rail section has the friction force increasing portion in the one part of the region where the slider is slidable. In the friction force increasing portion, a friction force between the slider and the slide rail section is large. A sliding friction force between the slide rail section and the slider as the slider slides on the friction force increasing portion (an increasing location) of the region is larger than a sliding friction force between the slide rail section and the slider as the slider slides on the portion (a normal location) other than the friction force increasing portion.

The friction force increasing portion can be appropriately easily set to provide the sliding friction force overcoming the urging force of the torsion bar. For example, a size, shape and surface roughness of the friction force increasing portion, and whether to provide a lug on the friction force increasing portion can be easily determined. Also, the configuration of the friction force increasing portion is simple, and does not require a part separate from the slide rail section. This prevents increase in the cost for the friction force increasing portion.

Just by producing the sliding friction force overcoming a slide load applied by the urging force of the torsion bar, it becomes possible to intentionally temporarily stop movement of the hinge arm and the opening-closing member between the open and closed positions as the hinge arm and the opening-closing member are opened to a certain opening degree. Also, in the increasing location, the sliding friction force overcoming the slide load provided by the urging force of the torsion bar prevents non-stop movement of the opening-closing member trunk to the fully opened position immediately after the opening-closing member begins to be opened. That is, the opening-closing member is prevented from popping up. There is no need for a separate member for preventing the opening-closing member from popping up.

Regarding the invention defined in claim 11, the friction force increasing portion is formed by the raised surface defined by the portion of the front surface of the slide rail section, the portion of the front surface of the slide rail section being raised in the direction opposite the urging direction of the torsion bar. The sliding friction force is increased by the slide surface of the slider sliding on the raised surface against the urging force of the torsion bar. The structure of the friction force increasing portion is simple.

Regarding the invention defined in claim 12, the slide rail section is provided by the generally flat-plate-shaped member. The slider has the pair of arm portions each generally L-shaped from the opposite edges of the slider extending in a direction of slide movement of the slide surface, such that the arm portions embrace edges of the slide rail section. The pair of arm portions comprises the pair of extension parts and the pair of bent parts. The pair of extension parts extends toward a back surface of the slide rail section. The pair of bent parts extends from distal ends of the extension parts toward each other. Thus, on the slide surface of the slider, a pair of slide grooves is formed extending along the opposite edges extending in the direction of the slide movement of the slider. The slide grooves are opened toward each other in an opposed relationship with each other. The pair of slide grooves slidably fits over the opposite edges of the slide rail section such that the slider does not fall out of the generally flat-plate-shaped slide rail section in a front-to-back direction of the slide rail section, i.e., the urging direction of the torsion bar or the direction opposite the urging direction.

A width of each of the slide groove, i.e., the interval from the slide surface of the slider to the pair of bent parts is set to be larger than the thickness of the slide rail section. The slider is held always in the surface-to-surface contact with the slide rail section in the urging direction of the torsion bar. The respective bent parts of the pair of arm portions do not contact the back surface of the slide rail section when the slide surface of the slider does not slide on the raised surface, during which the contact area is small to keep the friction resistance low.

Regarding the invention defined in claim 13, the interval is sized such that the pair of bent parts of the slider temporarily contacts the back surface of the slide rail section as the slide surface of the slider slides on the raised surface relative to the front surface of the slide rail section. Thus, while the slide surface slides on the raised surface, the respective bent parts of the pair of arm portions temporarily contact the back surface of the slide rail section, during which the contact area increases temporarily to thereby increase a friction resistance temporarily.

Regarding the invention defined in claim 14, the slide surface of the slider has the bar position corresponding to the location to which the torsion bar is connected. The bar position is set to reach the location immediately before the apex portion of the raised surface, when the pair of bent parts temporarily contacts the back surface of the slide rail section. As a result, the friction resistance increases temporarily just before the slide surface slides past the apex portion of the raised surface. Immediately after that, the slide surface slides past the apex portion of the raised surface, at which time the respective bent parts of the pair of arm portions become out of contact with the back surface of the slide rail section to thereby decrease the friction resistance. As a result, the opening-closing member can be opened with a small force.

Regarding the invention defined in claim 15, the apex portion of the raised surface is continuous with the flat surface on which the slide surface of the slider is slidable, the flat surface maintaining the same height from the apex portion 82*a*. zThe front surface of the slide rail section includes the surface other than the raised surface, and the flat surface is parallel to the surface other than the raised surface. For this reason, after the slide surface slides past the apex portion of the raised surface, the respective bent parts of the pair of arm portions remain out of contact with the back surface of the slide rail section, thereby maintaining the small friction resistance, such that the opening-closing member can be opened with a small invariable operating force.

Regarding the invention defined in claim 16, the raised surface is adjacent to the stop position of the slider in which the opening-closing member is fully closed. Thus, for example when a latch mechanism (not shown) of the opening-closing member is unlatched and the opening-closing member is brought from the fully closed position to a slightly open position, the raised surface temporarily stops the slider. As a result of the temporary stop of the slider, the opening-closing member also temporarily stops. This makes it possible to prevent unwanted opening motion of the opening-closing member. For example, after the latch mechanism is unlatched, the opening-closing member can temporarily stop in an opened position forming a space between the opening portion and the opening-closing member, such that an operator brings his hand into the space for further opening the opening-closing member.

BRIEF DESCRIPTION OF DRAWINGS

FIG. 7 is a schematic view diagrammatically showing a relationship between the left hinge mechanism, the torsion bar and the slide mechanism shown in FIG. 2;

FIG. 8 is a view showing the hinge mechanism and a swing proximal end portion shown in FIG. 4 as the swing proximal end portion sectioned longitudinally;

FIG. 9 is a cross-sectional view taken along line 9-9 of FIG. 8;

DESCRIPTION OF EMBODIMENT

Figure 1:
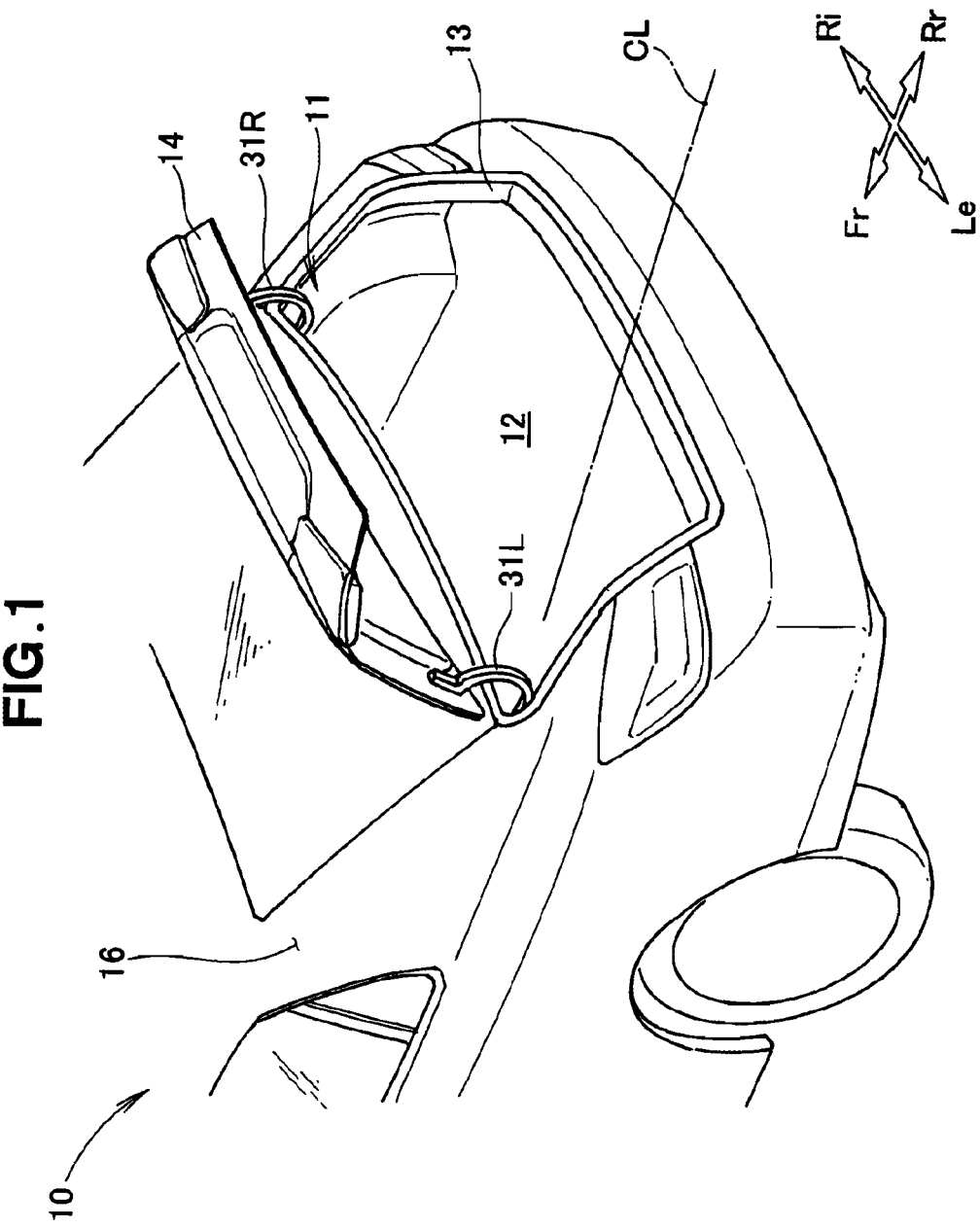
FIG. 1 is a perspective view of a rear part of a vehicle including an opening-closing device for opening and closing an opening formed in the vehicle in embodiment 1.

Certain preferred embodiments of the present invention are described below with reference to the accompanying drawings. The terms "front", "rear", "left", "right", "upper" and "lower" denote directions in which a driver views. Reference characters "Fr", "Rr", "Le", "Ri" and "CL" denote a front side, a rear side, a left side, a right side, and a vehicular width center, respectively.

Embodiment 1

An opening-closing device for a vehicular opening portion is discussed below with reference to FIGS. 1 to 13. FIG. 1 illustrates a rear part of a vehicle 10 having an opening-closing device 11 for the vehicular opening portion. The opening-closing device 11 has an opening-closing member 14 for opening/closing an opening portion 13 formed in the vehicle 10. For example, the opening-closing device 11 has a trunk lid (the opening-closing member) 14 for opening/closing a trunk opening portion (the opening portion) 13 of a trunk 12.

Figure 2:
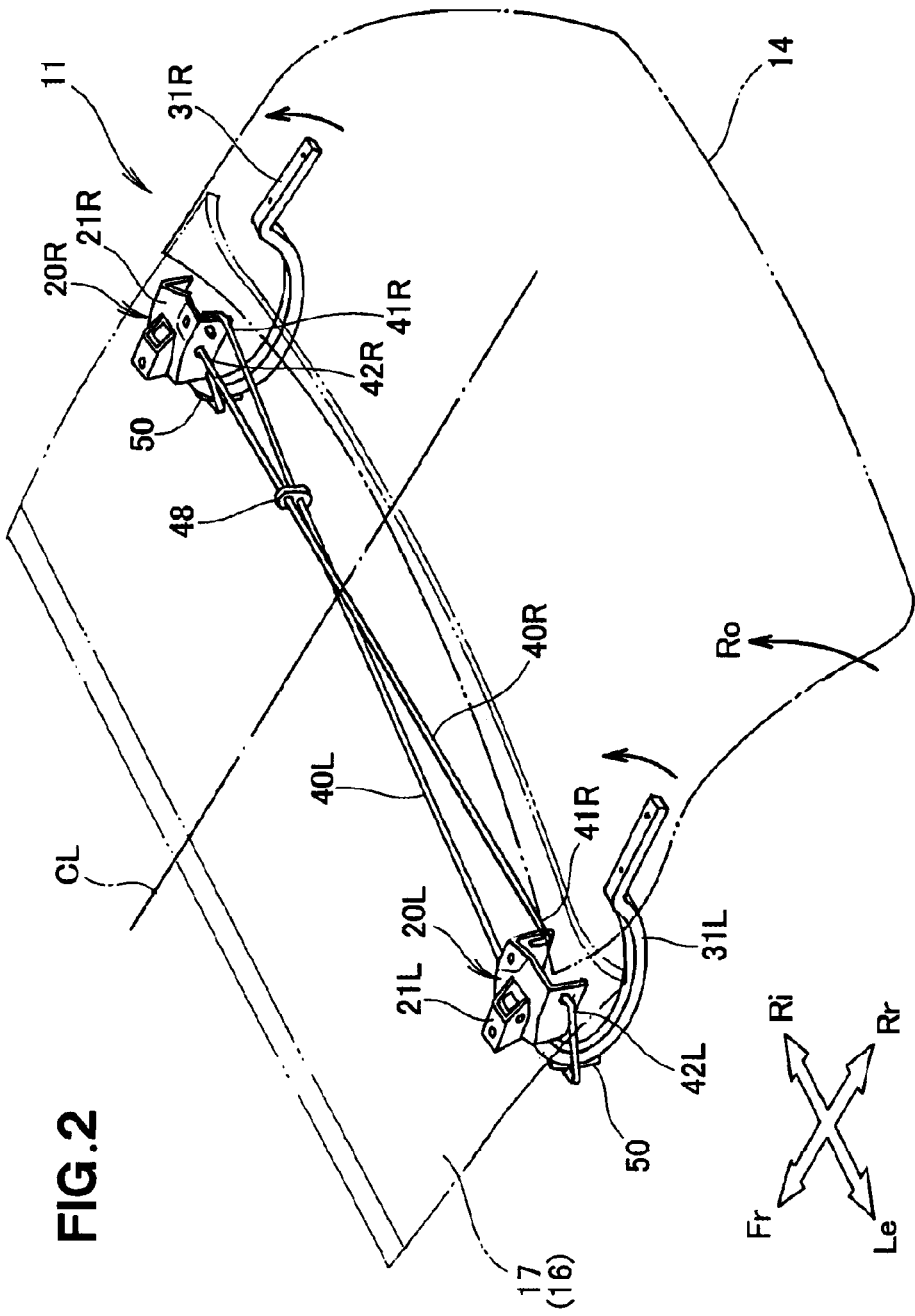
FIG. 2 is a perspective view of the opening-closing device shown in FIG. 1.

As shown in FIGS. 1 and 2, the opening-closing device 11 is comprised of the trunk lid 14, left and right hinge mechanisms 20L, 20R, left and right torsion bars 40L, 40R, and left and right slide mechanisms 50, 50. The left and right hinge mechanisms 20L, 20R are located on left and right sides within the trunk 12. The left and right hinge mechanisms 20L, 20R have substantially the same structure except that the mechanisms 20L, 20R are symmetrically arranged. The left and right torsion bars 40L, 40R have substantially the same structure except that the bars 40L, 40R are symmetrically arranged. The following description is made mainly as to the left hinge mechanism 20L and the left torsion bar 40L, and, where necessary, the right hinge mechanism 20R and the right torsion bar 40R are discussed.

The left hinge mechanism 20L is comprised of a hinge bracket 21L attached to a panel (e.g., a parcel shelf) 17 of a vehicle body 16, and a hinge arm 31L through which the trunk lid 14 is swingably supported by the hinge bracket 21L. That is, the trunk lid 14 is swingably supported by the vehicle body 16.

Figure 3:
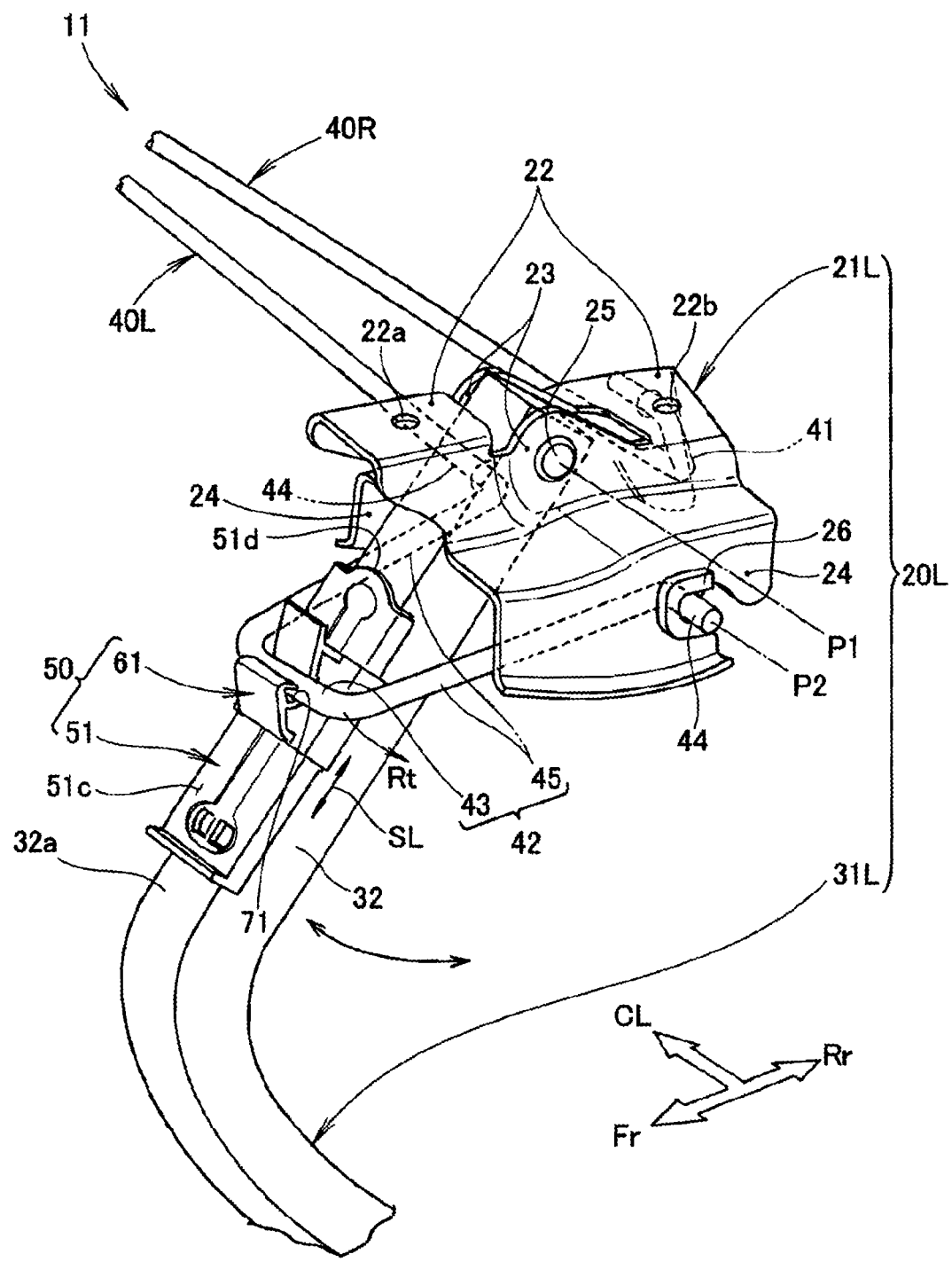
FIG. 3 is a perspective view of a left hinge mechanism, torsion bar and slide mechanism shown in FIG. 2.
Figure 4:
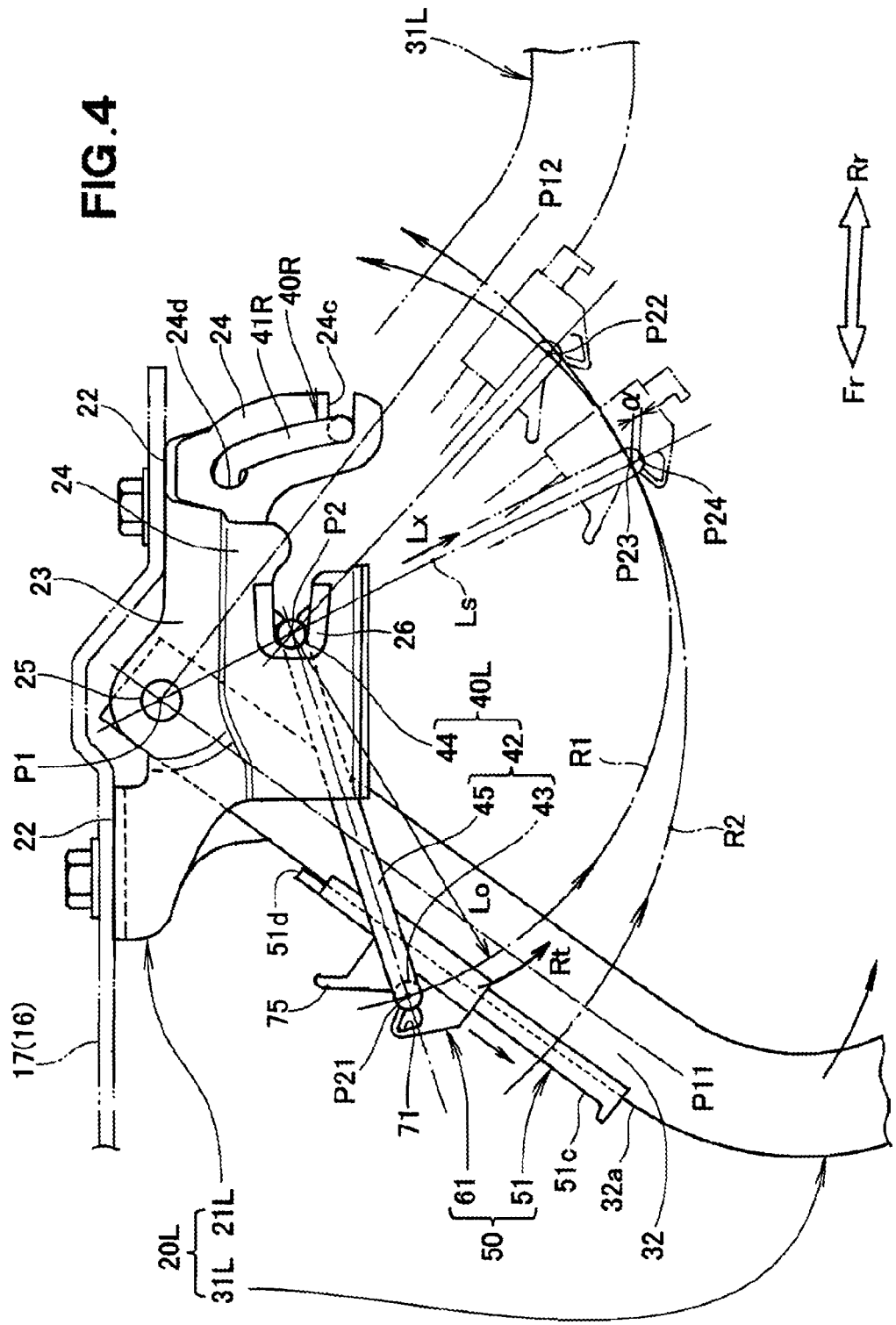
FIG. 4 is a side elevation view of the left hinge mechanism, torsion bar and slide mechanism shown in FIG. 3.
Figure 5:
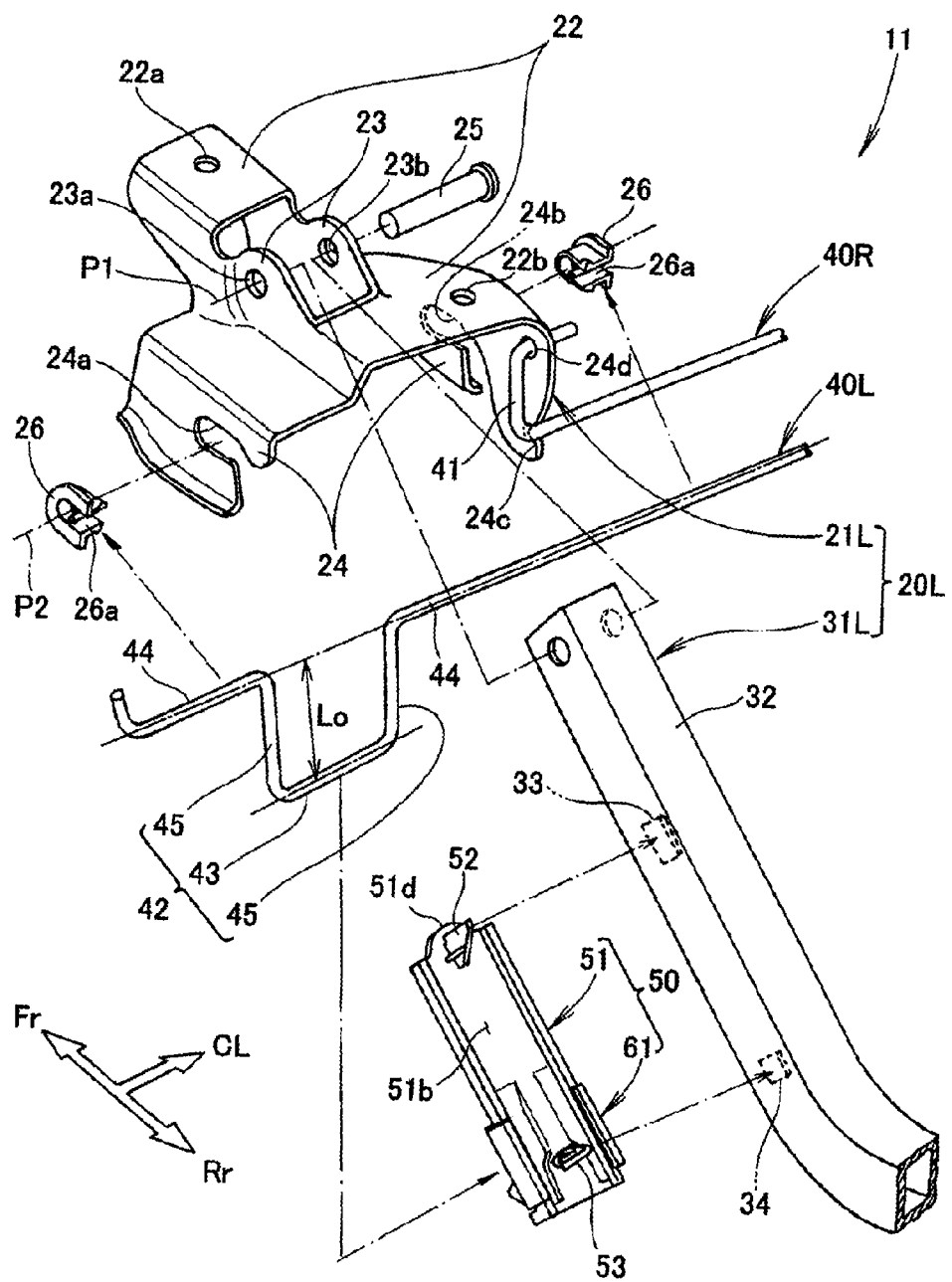
FIG. 5 is an exploded view of the left hinge mechanism, torsion bar and slide mechanism shown in FIG. 4.

As shown in FIGS. 3 to 5, the hinge bracket 21L is formed from a steel bent product comprised of an attached portion 22, arm support portions 23 and bar support portions 24.

The attached portion 22 is a portion attached to the panel 17. When viewed from behind the vehicle, the attached portion 22 is generally U-shaped to open downwardly. The attached portion 22 has attachment holes 22a, 22b formed in a top plate thereof to bolt the top plate to a bottom surface of the panel 17 (FIG. 2).

The arm support portions 23 are formed integrally with an intermediate part of the attached portion 22. More specifically, the arm support portions 23 are defined by extension of left and right side plates of the attached portion 22 in a rear direction of the vehicle and have support holes 23a, 23b formed therethrough in a widthwise direction of the vehicle such that a support shaft 25 fits through the holes 23a, 23b. zThe bar support portions 24 are formed integrally with and below the attached portion 22 and the arm support portions 23. The bar support portions 24 are spaced from each other in the widthwise direction of the vehicle by a distance larger than a width of the attached portion 22 and a distance between the arm support portions 23. When viewed from behind the vehicle, the bar support portions 24 are formed to provide a general inverted-U-shape opened downwardly. The bar support portions 24 have left and right first horizontal slits 24a, 24b opened in a rear direction of the vehicle body for supporting the left torsion bar 40L. The slits 24a, 24b are arranged concentrically in the widthwise direction of the vehicle.

Figure 6:
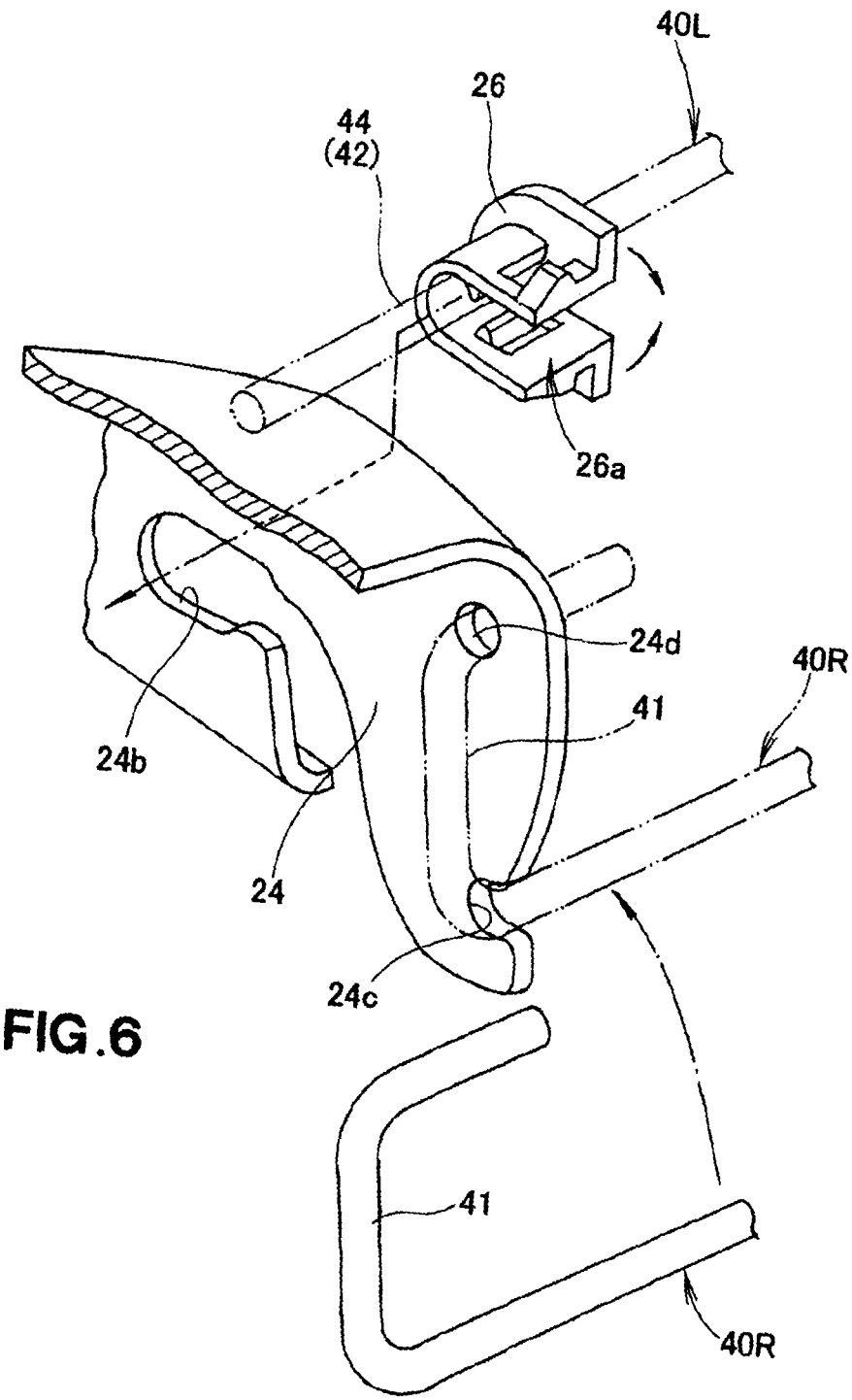
FIG. 6 is an enlarged view showing how to connect a bar support member and a torsion bar to a left hinge bracket.

As shown in FIGS. 5 and 6, left and right resinous bar support members 26, 26 are mounted in the left and right first slits 24a, 24b. zThe left torsion bar 40L has one end portion 41 and an opposite end portion 42. The left and right bar support members 26, 26 allow for smooth torsional motion of the left torsion bar 40L with the opposite end portion 42 of the left torsion bar 40L supported by the left and right first slits 24a, 24b. zThe left and right bar support members 26, 26 have slits 26a, 26a for insertion of the left torsion bar 40L from behind, and fit in the left and right first slits 24a, 24b in a snap-fit manner (resiliently locking engagement).

As shown in FIGS. 5 and 6, the bar support portion 24 located inwardly in the widthwise direction of the vehicle has a lateral side plate having a second slit 24c and a bar-hooked hole 24d formed therein. The slit 24c and the bar-hooked hole 24d are located rearwardly of the first slit 24b. zThe bar-hooked hole 24d is located above the second slit 24c and extends through the lateral side plate in the widthwise direction of the vehicle. The second slit 24c and the bar-hooked hole 24d are holes to hook one end 41 of the right torsion bar 40R.

As shown in FIGS. 2 to 4, the hinge arm 31L has a swing proximal end supported by the support shaft 25 at the arm support portions 23 such that the proximal end swings in a front-rear direction of the vehicle. The hinge arm 31L is, for example, a square pipe of a uniform cross-sectional shape and thickness and generally U-shaped as viewed in side elevation. The hinge arm 31L has a swing distal end attached to the trunk lid 14. The hinge arm 31L has a portion 32 on a side of the swing proximal end and this portion 32 is hereinafter referred to as "arm proximal end portion 32". The arm proximal end portion 32 swings relative to the vehicle body 16 on a swing center P1 (a center P1 of the support shaft 25), and is a straight linear portion extending forwardly downwardly from the swing center P1 with the trunk lid 14 fully opened.

As shown in FIG. 4, the arm proximal end portion 32 can undergo a swing motion relative to the swing center P1 in the front-rear direction of the vehicle between a lid fully closed position P11 shown by a solid line and located forwardly downwardly and a lid fully open position P12 shown by a phantom line and located rearwardly downwardly. The lid fully closed position P11 is a position in which the trunk lid 14 is fully closed, as shown in FIG. 2. The lid fully open position P12 is a position in which the trunk lid 14 is fully opened, as shown in FIG. 1.

As shown in FIG. 2, the left torsion bar 40L is a member extending in the widthwise direction of the vehicle and urging the left hinge arm 31L in a direction Ro in which the trunk lid 14 is opened. The right torsion bar 40R is a member extending in the widthwise direction and urging the right hinge arm 31R in the direction Ro in which the trunk lid 14 is opened. That is, the right and left torsion bars 40L, 40R have substantially the same function. The left and right torsion bars 40L, 40R are arranged in the front-rear direction of the vehicle and crossing each other. The left and right torsion bars 40L, 40R are secured to the parcel shelf 17 by means of a clip 48.

As shown in FIG. 7, the one end portion 41 of the left torsion bar 40L is bent back to form a general U-shape and hooked through a second slit 24c and bar-hooked hole 24d of a right hinge bracket 21R. As a result, the one end portion 41 of the left torsion bar 40L is connected such that rotation of the one end portion 41 relative to the vehicle body 16 is limited.

As shown in FIGS. 4 to 6, the opposite end portion 42 of the left torsion bar 40L is formed in a general crank-shape (a general U-shape). More specifically, the opposite end portion 42 is defined by a pair of extension parts 45, 45 extending from a straight part of the torsion bar 40L radially outwardly of the torsion bar 40L, and a straight pressed part 43 (an urging force applying portion 43) interconnecting respective distal ends of the extension parts 45, 45. The pressed part 43 is parallel to the straight part of the torsion bar 40L.

In addition, the left torsion bar 40L has bar supported portions 44, 44 adjacent the opposite end portion 42. The bar supported portions 44, 44 are rotatably supported by the left and right first slits 24a, 24b (the bar support portions 24, 24) via the left and right bar support members 26, 26. That is, the left torsion bar 40L is supported such that the torsion bar 40L is rotatable relative to the vehicle body 16. The bar supported portions 44, 44 have a support center P2 in the left and right first slits 24a, 24b. zThe left torsion bar 40L has the support center P2 relative to the vehicle body 16. The support center P2 is located rearwardly of the swing center P1 of the hinge arm 31L in the rear direction of the vehicle body. More specifically, the support center P2 of the opposite end portion 42 of the left torsion bar 40L is located rearwardly of and below the swing center P1 of the hinge arm 31L. The pressed part 43 is offset an offset amount Lo (FIG. 5) from the bar supported portions 44, 44. The pressed part 43 swings relative to the support center P2 of the left torsion bar 40L on a path having the same length of radius as that of the offset amount Lo.

As shown in FIG. 7, via the left slide mechanism 50, the pressed part 43 of the opposite end portion 42 of the left torsion bar 40L urges the hinge arm 31L in the direction Ro in which the trunk lid 14 (FIG. 2) is opened.

As shown in FIGS. 2 to 4, the left and right slide mechanisms 50, 50 are defined by left and right slide rail sections 51 (only left one shown), and left and right sliders 61 (only left one shown). The left and right slide rails 51 and the left and right sliders 61 are made from, for example, hard resin.

The left and right slide rail sections 51 have the same structure. The left and right sliders 61 have the same structure, too. Thus, discussions mainly as to the left slide rail section 51 and the left slider 61 are made below, and, where necessary, the right rail section 51 and the right slider 61 are discussed.

As shown in FIGS. 3 and 4, the left slide rail section 51 is provided by a vertically elongated member of a generally flat-plate shape. The left slide rail section 51 is provided on a surface 32a of the left hinge arm 31L (the surface 32a is a front surface 32a facing a front side of the vehicle body). That is to say, the slide rail section 51 is located on the front surface 32a of the arm proximal end portion 32. The slide rail section 51 has an upper end 51d located towards the swing center P1 of the arm proximal end portion 32.

More specifically, as shown in FIGS. 5, 8 and 9, the slide rail section 51 is a member different from the arm proximal end portion 32, and has a back surface 51b overlapping the front surface 32a of the arm proximal end portion 32. For this reason, the slide rail section 51 is easier to produce than if the slide rail section is formed integrally with the large-sized arm proximal end portion 32.

The back surface 51b of the slide rail section 51 is parallel to the front surface 32a of the arm proximal end portion 32 in an overlapping relationship with the front surface 32a. zThe slide rail section 51 has a uniform thickness; hence a front surface 51c (a surface 51c on which the slider slides) of the slide rail section 51 is parallel to the back surface 51b of the slide rail section 51 and to the front surface 32a of the proximal end portion 32.

The front surface 32a of the arm proximal end portion 32 has a first attachment hole 33 located towards the swing center P1 of the arm proximal end portion 32, and a second attachment hole 34 located downwardly of the swing center P1 and farther from the swing center P1 than the first attachment hole 33. The slide rail section 51 has a generally L-shaped hook portion 52 engaged with the first attachment hole 33, and a clip portion 53 locked to the second attachment hole 34 in a snap-fit manner. As shown in FIG. 9, the slide rail section 51 has a width larger than a width of the arm proximal end portion 32.

The slide rail section 51 is assembled to the arm proximal end portion 32 in the following manner. First, the hook portion 52 is inserted into hooking engagement with the first attachment hole 33. Next, the clip portion 53 is forced into hooking engagement with the second attachment hole 34 located below the first attachment hole 33.

Figure 10:
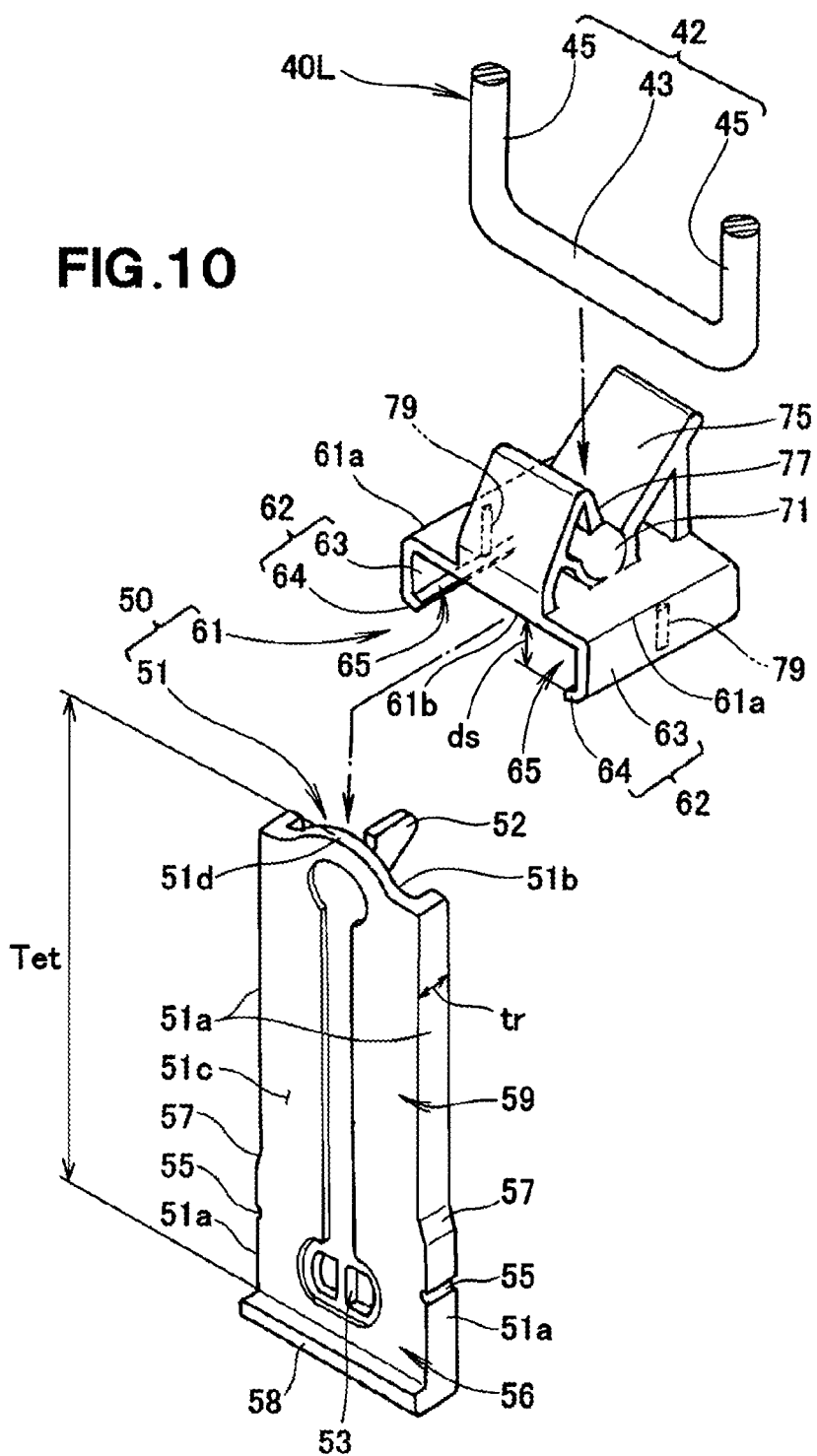
FIG. 10 is an exploded view of the slide mechanism shown in FIG. 8.
Figure 11:
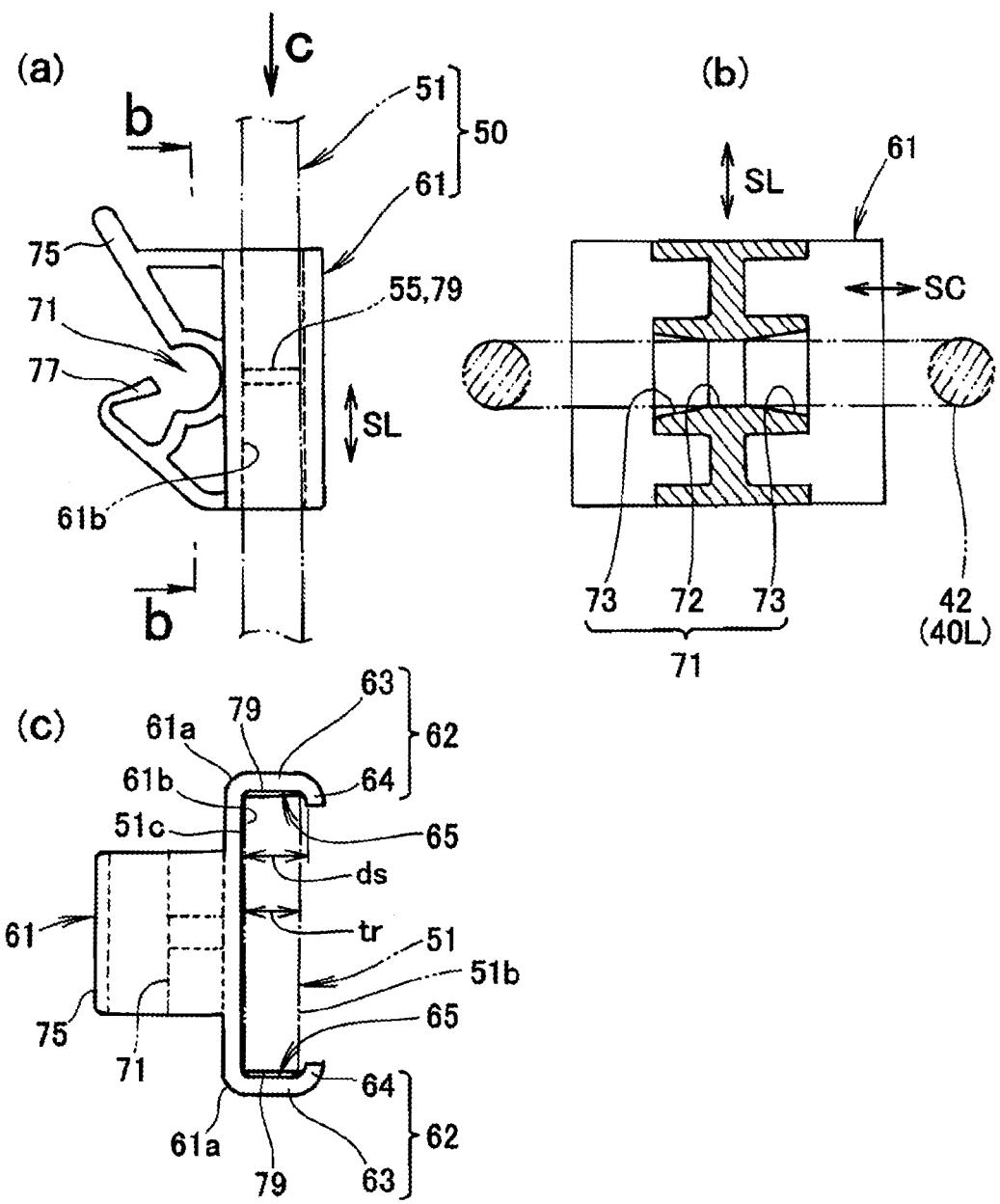
FIG. 11 is an enlarged view of a bar connecting opening, bar guiding portion and bar retaining portion of a slider shown in FIG. 10.

As shown in FIGS. 8, 10 and 11, the slider 61 is guided by the slide rail section 51 to slide in a longitudinal direction of the hinge arm 31L, that is, move vertically in response to the swing motion of the arm proximal end portion 32. The left and right sliders 61 are connected to the left and right torsion bars 40L, 40R, that is, the opposite end portions 42, 42.

The slider 61 has a pair of arm portions 62, 62 each generally L-shaped from opposite edges 61a, 61a of the slider 61 extending in a direction of slide movement of the slider 61, such that the arm portions 62, 62 embrace edges 51a, 51a of the slide rail section 51. The pair of arm portions 62, 62 is defined by a pair of extension parts 63, 63 and a pair of bent parts 64, 64.

The pair of extension parts 63, 63 extends from a slide surface 61b (an opposed, back surface 61b) opposed to the surface 51c of the slide rail section 51, and extends near the edges 51a, 51a of the slide rail section 51 toward the back surface 51b of the slide rail section 51. The pair of bent parts 64, 64 extends from distal ends of the extension parts 63, 63 and then along the back surface 51b of the slide rail section 51 toward each other. An interval ds from the slide surface 61b to the pair of bent parts 64, 64 is set to be larger than a thickness tr of the slide rail section 51.

Formed on the slide surface 61b of the slider 61 is a pair of slide grooves 65, 65 extending along the opposite edges 61a, 61a extending in the direction of the slide movement of the slider 61. The slide grooves 65, 65 are opened toward each other in an opposed relationship with each other. The width ds (an interval ds) of each of the slide grooves 65, 65 is set to be larger than the thickness tr of each of the opposite edges 51a, 51a of the slide rail section 51. The slider 61 is slidable with the pair of slide grooves 65, 65 fitting over the edges 51a, 51a.

The front surface 51c of the slide rail section 51 and the slide surface 61b of the slider 61 are flat surfaces. The slide surface 61b of the slider 61 is slidable on the front surface 51c of the slide rail section 51.

As shown in FIGS. 3, 8 and 10, the slider 61 includes a bar connecting opening 71, a bar guiding portion 75 and a bar retaining portion 77. The bar connecting opening is formed in the slider 61, and the pressed part 43 of the opposite end portion 42 of the torsion bar 40L is connected to the bar connecting opening 71 by fitting in the opening 71. The opposite end portion 42 (the pressed part 43) is rotatable and torsionally displaceable relative to the slider 61.

The slider 61 is held always in surface-to-surface contact with the slide rail section 51 in an urging direction Rt of the torsion bar 40L. In other words, the slide surface 61b of the slider 61 is held to the slide rail section 51 without being spaced therefrom. That is, the slide surface 61b is held to the slide rail section 51 without being spaced from the slide rail section 51 in the direction Rt in which the torsion bar 40L urges the hinge arm 31L.

The bar connecting opening 71, the bar guiding portion 75 and the bar retaining portion 77 are discussed in detail with reference to FIG. 11. FIG. 11(a) shows the slider 61 as viewed in side elevation. FIG. 11(b) shows a cross-section taken along line b-b of FIG. 11(a). FIG. 11(c) shows the slider 61 as taken in a direction of arrow c.

The bar connecting opening 71 is provided by a grooved portion extending in a direction perpendicular to a slide direction SL in which the slider 61 slides relative to the slide rail section 51. The grooved portion 71 (the bar connecting opening 71) is opened oppositely from the back surface 61b of the slider 61. In other words, the grooved portion 71 is opened in a direction opposite the direction Rt in which the hinge arm 31L is urged by the torsion bar 40L shown in FIG. 4, i.e., in which the hinge arm 31L is urged by the opposite end portion 42.

The grooved portion 71 extends in a direction SC perpendicular to the slide direction SL in which the slider 61 slides. The grooved portion 71 is defined by a central part 72 located at a center in a longitudinal direction of a groove of the grooved portion, and opposite end parts 73, 73 located on opposite sides of the central part 72 in the longitudinal direction of the groove. The central part 72 is in the form of a straight groove parallel to the longitudinal direction of the groove. The opposite end parts 73, 73 are in the form of taper grooves widening from the central part 72 outwardly in the longitudinal direction of the groove.

As shown in FIGS. 10 and 11, thus, the opposite end portion 42 of the torsion bar 40L is connected only to the straight groove 72 (the central part 72) if the opposite end portion 42 inclines relative to the grooved portion 71. That is, the inclined opposite end portion 72 does not contact only the longitudinal end parts 73, 73 of the grooved portion 71. For this reason, the bar connecting opening 71 enhances its durability. Additionally, even if the opposite end portion 42 of the torsion bar 40L inclines relative to the grooved portion 71, the opposite end portion 42 can be borne by the straight groove 72 alone. The opposite end portion 42 applies its urging force to a middle position (the central part 72) in the longitudinal direction of the groove of the grooved portion 71. As a result, the inclination of the slider 61 relative to the slide rail section 51 is prevented to thereby allow the slider 61 to slide more smoothly.

The bar guiding portion 75 is formed integrally with the slider 61 and inclines to guide the pressed part 43 into the bar connecting opening 71 when the pressed part 43 of the torsion bar 40L supported by the first slits 24a, 24b of the bar supporting portions 24 fits in the bar connecting opening 71. The bar guiding portion 75 provides a downward slope from its region on a side of the swing center P1 (FIG. 4) of the arm proximal end portion 32 toward the bar connecting opening 71.

The bar retaining portion 77 is formed integrally with the slider 61 and prevents the pressed part 43 fitting in the bar connecting opening 71 from falling out of the bar connecting opening 71. The bar retaining portion 77 includes a rising part rising from a side opposite the bar guiding portion 75, and a downwardly extending part extending downwardly from a top end of the rising part toward the bar connecting opening 71. The downwardly extending part has a bottom end resiliently deformable in the slide direction SL of the slider 61. When the pressed part 43 is to fit in the bar connecting opening 71, the bar retaining portion 77 resiliently deforms to allow the pressed part 43 to fit in the bar connecting opening 71. After the pressed part 43 fits in the bar connecting opening 71, the bar retaining portion 77 prevents the pressed part 43 from falling out of the bar connecting opening 71.

Figure 12:
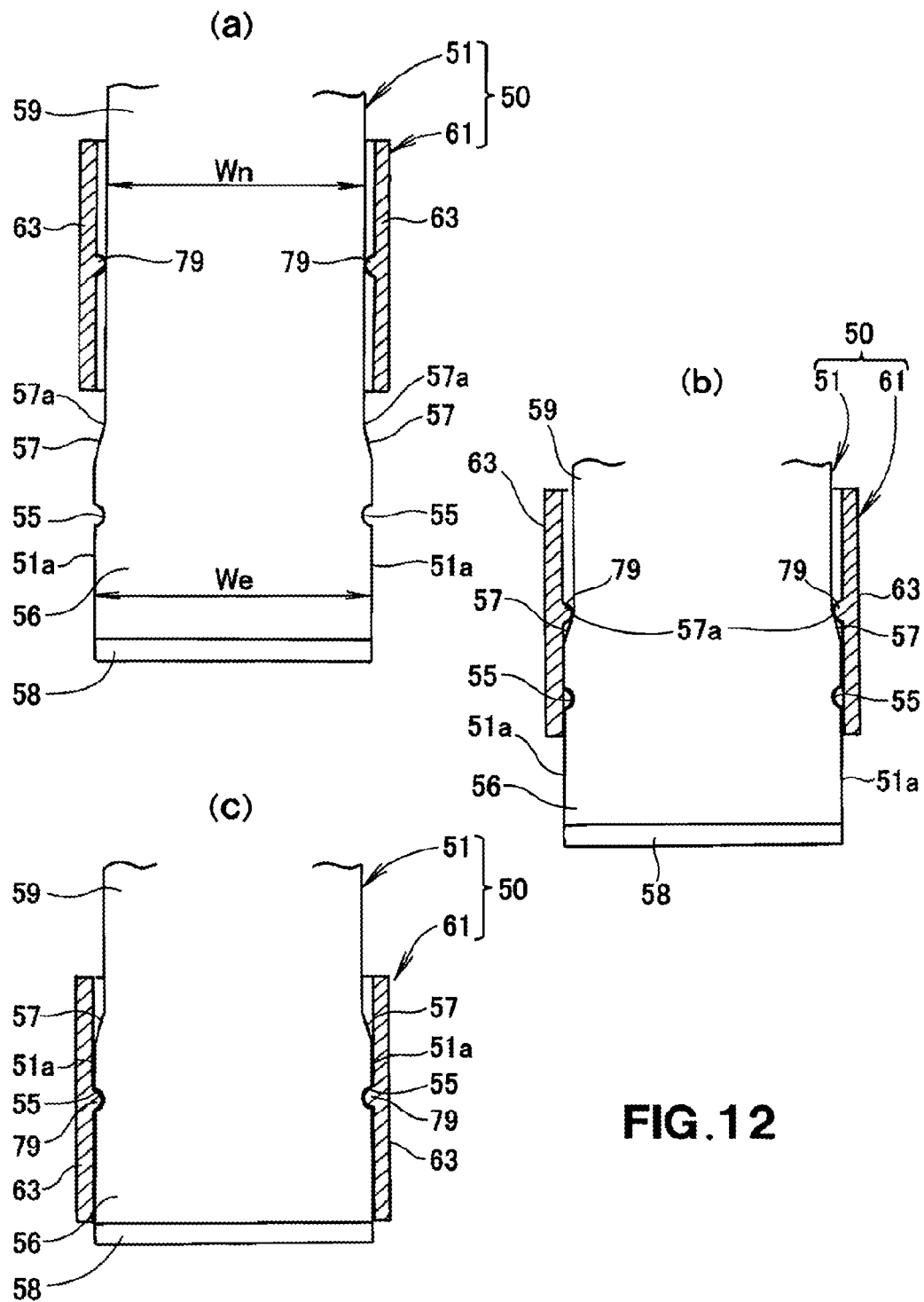
FIG. 12 is a view showing a relationship between the slider and a slide rail section shown in FIG. 10.

As shown in FIGS. 10 and 12, the slide rail section 51 includes a pair of locking recesses 55, 55, a wide part 56, a pair of slopes 57, 57, and a stopper part 58. FIG. 12(a) shows that the slider 61 is located in an upper part of the slide rail section 51. The slider 61 is located in a position shown in FIG. 12(a) as the trunk lid 14 is (FIG. 2) is fully closed. This position corresponds to a fully closed position P21 shown in FIG. 4.

The wide part 56 of the slide rail section 51 is a large width part where the pair of locking recesses 55, 55 is located. The wide part 56 has a width We set to be larger than a width Wn of the other part 59 (a normal slide part 59) of the slide rail section 51.

The pair of slopes 57, 57 is formed on the opposite edges 51a, 51a of the slide rail section 51 such that a width of a region between the normal slide part 59 and the wide part 56 is gradually changed. The slopes 57, 57 have points 57a, 57a on the opposite edges 51a, 51a of the slide rail section 51, and the slopes 57, 57 start from these points 57a, 57a, which are hereinafter referred to as "slope starting points 57a, 57a".

The pair of locking recesses 55, 55 is formed on, e.g., the opposite edges 51a, 51a of the slide rail section 51. That is, the pair of locking recesses 55, 55 takes the form of arc-shaped cross-sectional grooves formed through a thickness of the slide rail section 51. Formed on the slider 61 is a pair of convex-shaped locking portions 79, 79 lockable in the pair of locking recesses 79, 79. The pair of locking portions 79, 79 protrudes from inner surfaces of the pair of the extension parts 63, 63 toward each other. The pair of locking portions 79, 79 takes the form of arc-shaped cross-sectional convexities elongated in a longitudinal direction of each of the locking portions 79, 79. A distance between distal ends of the pair of locking portions 79, 79 is set to be the same as a length of the width Wn of the normal slide part 59 of the slide rail section 51, or somewhat larger than the length of the width Wn.

The slider 61 shown in FIG. 12(a) is guided by the slide rail section 51 to slide downwardly. As a result, as shown in FIG. 12(b), the pair of locking portions 79, 79 is located at the slope starting points 57a, 57a from which the pair of slopes 57, 57 starts. The slider 61 is prevented from being further lowered along the slide rail section 51. That is, the pair of slope starting points 57a, 57a functions as stoppers, and, where necessary, is referred to as "a pair of stoppers 57a, 57a".

As discussed above, the slide rail section 51 has the stoppers 57a, 57a defining a lowest position to which the slider 61 can be lowered. The pair of stoppers 57*a*, 57*a* is located at positions corresponding to a lowest position P24 shown in FIG. 4. That is, the slider 61 can be lowered in response to the swing motion of the arm proximal end portion 32, but be retained by the stoppers 57*a*, 57*a* at the lowest position P24. This can result in increasing efficiency of assembling the slide rail section 51, the slider 61 and the opposite end portion 42 of the torsion bar 40L together.

After that, forcefully pushing down on the slider 61 at the slope starting points 57*a*, 57*a* causes the slider 61 to be guided by the slide rail section 51 to slide further downward. The pair of slopes 57, 57 of the slide rail section 51 enables smooth movement of the slider 61 between the normal slide part 59 and the wide part 56. Since the slider 61 is a resin product, the extension parts 63, 63 can resiliently deform somewhat away from each other. Movement of the slider 61 from the normal slide part 59 to the wide part 56 causes the pair of locking portions 79, 79 to reach the wide part 56, and subsequently be locked in the pair of locking recesses 55, 55. The pair of locking portions 79, 79 can be relatively firmly locked in the pair of locking recesses 55, 55 under resilient force of the pair of extension parts 63, 63.

FIG. 12(*c*) shows that the slider 61 is located in a lower part of the slide rail section 51 to thereby lock the pair of locking portions 79, 79 in the pair of locking recesses 55, 55. Since the locking portions 59, 59 are locked in the locking recesses 55, 55, the slider 61 is retained on the slider rail section 51. Thus, the slider 61 can be provisionally assembled to the slide rail section 51 to thereby achieve the improved conveyance thereof to a subsequent process.

Referring to FIG. 4, as discussed above, the arm proximal end portion 32 can swing relative to the swing center P1 in the front-rear direction between the lid fully closed position P11, located forwardly downwardly, as shown by the solid line and the lid fully open position P12, located rearwardly downwardly, as shown by the phantom line. The lid fully closed position P11 is the position in which the trunk lid 14 is fully closed, as shown in FIG. 2. The lid fully open position P12 is the position in which the trunk lid 14 is fully closed, as shown in FIG. 1.

The center of the pressed part 43 of the torsion bar 40L swings relative to a swing center (the support center P2 of the torsion bar 40L) in the front-rear direction, on a swing trajectory R1 between the fully closed position P21 located forwardly downwardly, as shown by a solid line and the fully open position P22 located rearwardly downwardly, as shown by a phantom line. That is, when the arm proximal end portion 32 is located in the lid fully closed position P11, the center of the pressed part 43 is located in the fully closed position P21. When the arm proximal end portion 32 is located in the lid fully open position P12, the center of the pressed part 43 is located in the fully open position P22. The swing trajectory R1 of the pressed part 43 is on a perfect circle, extending about the support center P2 of the opposite end portion 42 of the torsion bar 40L (the support center P2 of the torsion bar 40L).

A point P23 (an intersection P23) at which the swing trajectory R1 of the pressed part 43 intersects a swing centerline Ls passing through the upper and lower swing centers P1, P2 is located between the fully closed position P21 and the fully open position P22. The intersection P23 swings on a swing trajectory R2 about the swing center P1 of the arm proximal end portion 32. The two swing trajectories R1, R2 are downwardly convex trajectories about the swing centers P1, P2.

As discussed above, the two, upper and lower swing centers P1, P2 do not coincide. That is, the center P2 is located below the center P1. Thus, the pressed part 43 swings from the fully closed position P21 to the fully open position P22 through a swing angle larger than (different from) a swing angle through which the arm proximal end portion 32 swings from the lid fully closed position P11 to the lid fully open position P12. As a result, the swing trajectory R1 of the intersection P23 about the center P2 does not coincide with the swing trajectory R2 of the intersection P23 about the center P1.

Since the slide mechanism 50 is provided in the embodiment 1, the respective parts can undergo smooth motion in spite of that difference in swing angle. That is, the slide mechanism 50 performs angle conversion. More specifically, the slider 61 can slide up and down only on the slide rail section 51 along the arm proximal end portion 32. As a result, the slider 61 performs angle conversion in response to the swing motion of the pressed part 43.

When the two swing trajectories R1, R2 are viewed from a side of the two, upper and lower swing centers P1, P2 in a direction (a direction of arrow Lx) along the swing centerline Ls, the intersection P23 is a position in which the pressed part 43 and the slider 61 are fully lowered. The intersection P23 is hereinafter referred to as "fully lowered position P23". The fully lowered position P23 is a bottom limit to which the slider 61 can be lowered relative to the slide rail section 51. More specifically, the fully lowered position P23 is the bottom limit of a range of movement of the slider 61 with the torsion bar 40L connected to the slider 61.

When the pressed part 43 swings from the fully closed position P21 to the fully open position P22, the slider 61 under the urging force of the torsion bar 40L swings rearwardly as the slider 61 is lowered from the fully closed position P21 to the fully lowered position P23 and then raised from the fully lowered position P23 to the fully open position P22.

On the swing centerline Ls, the lowest position P24 is set at or below the fully lowered position P23 in which the slider 61 is fully lowered in response to the swing movement of the arm proximal end portion 32. The lowest position P24 is a lower limit of a range of movement of the slider 61 with the torsion bar 40L not connected to the slider 61. That is, the lowest position P24 is set at the fully lowered position P23 or a predetermined play α distant therefrom to allow for further descent of the slider. A distance β (not shown) from the support center P2 of the torsion bar 40L to the lowest position P24 is the sum of the play α and the offset amount Lo from the bar supporting portion 44 to the pressed part 43 (β=Lo+α). It should be noted that the value of the play α is not less than 0 (α≥0).

The slider 61 is set in the fully open position P22 higher than the fully lowered position P23 relative to the slide rail section 51 when the trunk lid 14 is fully opened. Thus, the slider 61 does not forcefully strike, e.g., the stoppers 57*a*, 57*a* even if the trunk lid 14 (FIG. 1) is subjected to "over-stroke operation", that is, even if the trunk lid 14 is opened further beyond the fully open position. Since the slider 61 does not forcefully strike the stoppers 57*a*, 57*a*, the stoppers 57*a*, 57*a* increase their durability.

As shown in FIGS. 8 and 10, the stopper part 58 is formed on the slide rail section 51 to prevent the slider 61 from falling out of a lower end of the slide rail section 51. The front surface 51*c* of the slide rail section 51 has a region Tet where the slider 61 is slidable, and the region Tet ranges from the upper end 51*d* of the slide rail section 51 to the stopper part 58.

The slider 61 is detachably provided on the slide rail section 51 located on the arm proximal end portion 32 such that the slider 61 is detachable from a side opposite the stoppers 57a, 57a (the stopper part 58). This allows the slider 61 to be easily replaced with another slider for the slide rail section 51 provided on the arm proximal end portion 32. That is, the replacement workability can be improved.

The foregoing description of the embodiment 1 is summarized as follows. As shown in FIG. 4, the slider 61 is held always in surface-to-surface contact with the slide rail section 51 in the urging direction Rt of the torsion bar 40L. Thus, even if the opposite end portion 42 of the torsion bar 40L is connected to the slider 61 while twisting and inclining relative to the slider 61, the slider 61 can sufficiently maintain the surface-to-surface contact with the slide rail section 51. As a result, even if the torsion bar 40L (FIG. 2) applies the urging force to the hinge arm 31L in a direction somewhat different from the direction Ro in which the trunk lid 14 is opened, the hinge arm 31L and the trunk lid 14 can swing smoothly. In addition, occurrence of partial wear, meaning that a contact surface between the slide rail section 51 and the slider 61 partially wears, can be reduced as much as possible. As a result, the durability of the opening-closing device 11 can be enhanced.

A sliding friction is produced between the slide rail section 51 and the slider 61. By appropriately setting the sliding friction force, a swing velocity of the hinge arm 31L can be set to an optimal value. As a result, a velocity at which the trunk lid 14 is opened and closed can be easily set to an optimal velocity. Further, there is no need for a mechanism to produce a frictional force for setting the opening/closing velocity of the trunk lid 14. As a result, the number of the parts can be reduced.

The slider 61 has the bar connecting opening 71 to which the torsion bar 40L, i.e., the opposite end portion 42 is connected by fitting in the opening 71.

It is possible to easily assemble the torsion bar 40L to the slider 61 only by fitting the opposite end portion 42 of the torsion bar 40L in the bar connecting opening 71 of the slider 61 assembled to the slide rail section 51 provided on a surface of the hinge arm 31L.

The bar connecting opening 71 is opened in the direction opposite the direction Rt in which the hinge arm 31L is urged by the opposite end portion 42 of the torsion bar 40L. Once the opposite end portion 42 of the torsion bar 40L twisting in the direction opposite the urging direction Rt is positioned in alignment with the bar connecting opening 71, the opposite end portion 42 of the torsion bar 40L automatically fits into the bar connecting opening 71 under its own urging force. Thus, high quality of assemblage of the torsion bar 40L to the slider 61 assembled to the hinge arm 31L is achieved. The torsion bar 40L fitting in the bar connecting opening 71 urges the hinge arm 31L in the direction in which the trunk lid is opened.

The trunk lid 14 pivots vertically between the open and closed positions for opening and closing the trunk opening portion 13 of the vehicle 10. The arm proximal end portion 32 of the hinge arm 31L through which the trunk lid 14 is supported on the vehicle body 16 is attached to the vehicle body 16 so as to swing in the front-rear direction. The torsion bar 40L urging the hinge arm 31L in the direction in which the trunk lid 14 is opened extends in a widthwise direction of the vehicle. The support center P2 of the opposite end portion 42 of the torsion bar 40L is located rearwardly of the swing center P1 of the hinge arm 31L in the rear direction of the vehicle body. The slide rail section 51 is located on the front surface 32a of the arm proximal end portion 32. The slider 61 is guided by the slide rail section 51 to slide in a longitudinal direction of the hinge arm 31L. The slider 61 is located in a lower part of the hinge arm 31L when the trunk lid 14 is opened.

The following steps are taken in assembling the opposite end portion 42 of the torsion bar 40L to the bar connecting opening 71 of the slider 61. The slider 61, assembled to the slide rail section 51, automatically moves downwardly in response to the trunk lid 14 being fully opened. The bar connecting opening 71 having moved downwardly can be set in such a position as to allow the opposite end portion 42 of the torsion bar 40L to fit in the bar connecting opening 71. The opposite end portion 42 of the torsion bar 40L twisting in the direction opposite the urging direction automatically fits into the bar connecting opening 71 under its own urging force. Thus, higher quality of assemblage of the torsion bar 40L to the slider 61 assembled to the hinge arm 31L is achieved.

Since the torsion bar 40L is located close to the hinge arm 31L, an available space in the trunk 12 (FIG. 1) is large.

As shown in FIG. 5, the slide rail section 51 has the hook portion 52 and the clip portion 53. The hook portion 52 is engaged with the first attachment hole 33 located towards the swing center P1 of the arm proximal end portion 32. The clip portion 53 is snap-fits and thus locked to the second attachment hole 34 farther from the swing center P1 than the first attachment hole 33.

As shown in FIG. 3, the urging direction Rt in which the urging force is applied from the torsion bar 40L to the bar connecting opening 71 is not perpendicular to the slide direction SL in which the slider 61 slides relative to the slide rail section 51. For this reason, a force often acts on an upper part of the slide rail section 51 (located toward the swing center P1) in a direction away from the arm proximal end portion 32.

In view of this, in the embodiment 1, as shown in FIG. 5, the upper part of the slide rail section 51 has the hook portion 52. The hook portion 52 can be locked more steadily than the clip portion 52. Thus, the attachment of the slide rail section 51 to the arm proximal end portion 32 can be sufficiently maintained.

Figure 13:
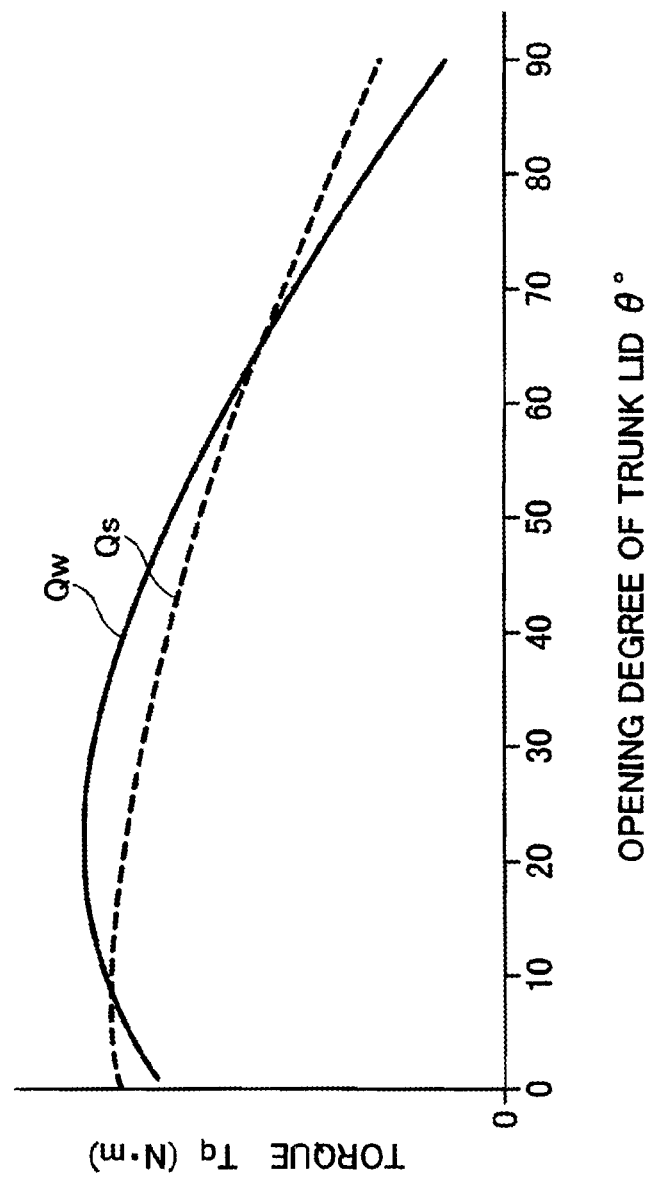
FIG. 13 is a graph showing a relationship between a torque by a weight of a trunk lid shown in FIG. 2 and a torque by the torsion bar.

FIG. 13 is a graph showing a relationship between a torque under the weight of the trunk lid 14 and a torque by the left and right torsion bars 40L, 40R. The graph having an abscissa axis showing a degree of opening (θ) of the trunk lid 14 an ordinate axis showing a torque Tq (N·m) shows a characteristic of the torque relative to the opening degree θ. A curve Qw indicated by a solid line shows a characteristic of the torque under the weight of the trunk lid 14. A curve Qs indicated by a broken line shows a characteristic of the torque by the left and right torsion bars 40L, 40R.

The curve Qw shows that the characteristic of the torque under the weight of the trunk lid 14 is an upward convex parabolic characteristic. The curve Qs shows that the characteristic of the torque by the left and right torsion bars 40L, 40R is similar to the characteristic shown by the curve Qw. This means that there is little difference between the torque under the weight of the trunk lid 14 and the torque by the left and right torsion bars 40L, 40R. That is, good operability is achieved because a manual operating force to open the trunk lid 14 is small.

Embodiment 2

An opening-closing device 11A for opening and closing a vehicular opening in an embodiment 2 is discussed below with reference to FIG. 14 to FIG. 21. The opening-closing device 11A in the embodiment 2 has the same structure as that shown in FIGS. 1 to 12 except that the left and right slide mechanisms 50 are replaced with left and right slide mechanisms 50A (left one shown) shown in FIG. 17, and hence a discussion of the same structure of the device 11A as that shown in FIGS. 1 to 12 is omitted. A discussion below is made as to the left slide mechanism 50A and a discussion of the right slide mechanism 50A is omitted.

More specifically, as shown in FIGS. 14 to 17, the left slide mechanism 50A in the embodiment 2 is comprised of a left slide rail section 51A and a left slider 61A. The left slide rail section 51A has the same basic structure as that of the left slide rail section 51 in the embodiment 1, and the left slider 61A has the same basic structure as that of the left slider 61 in the embodiment 1.

Figure 14:
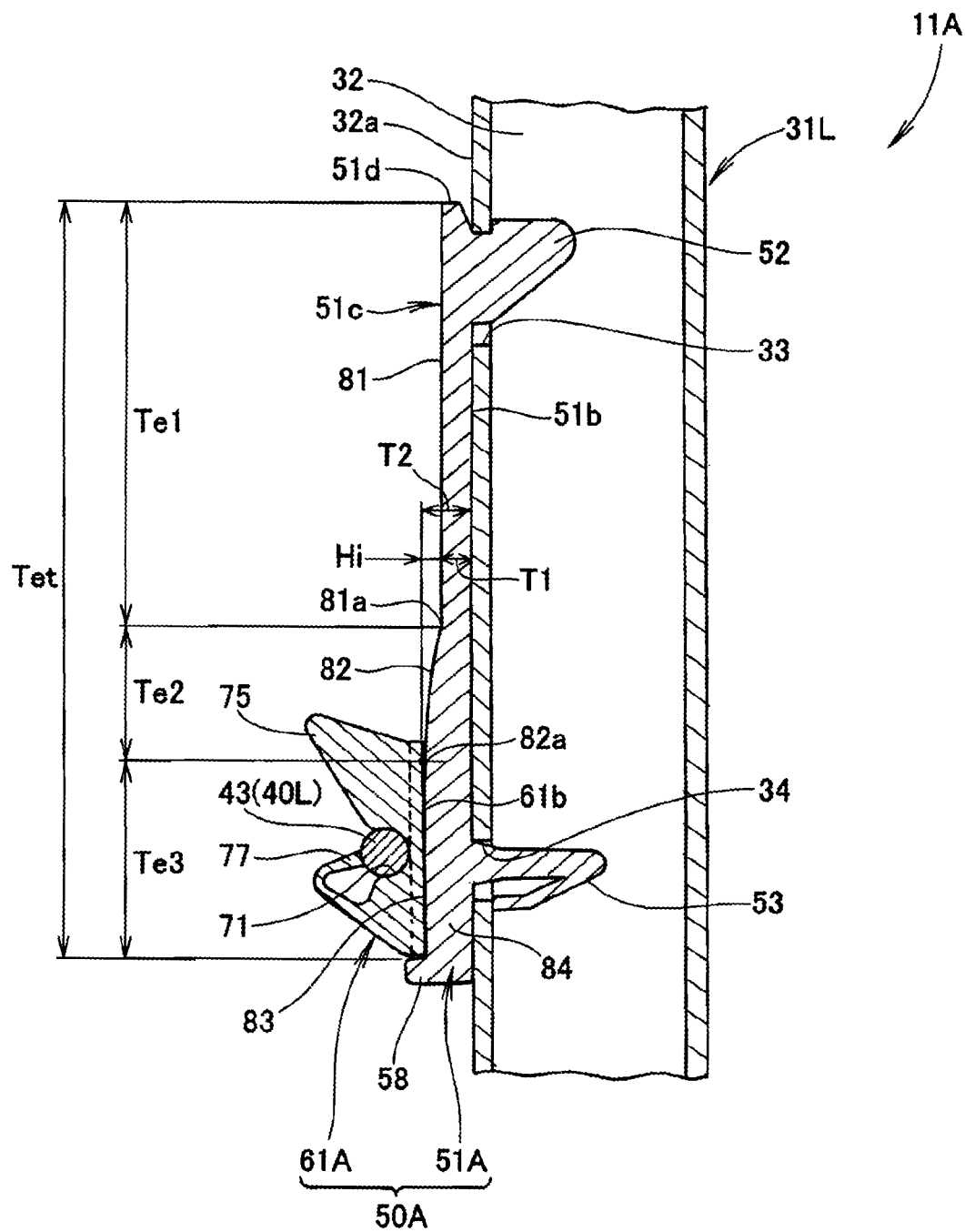
FIG. 14 is a view showing a hinge mechanism and swing proximal end portion of an opening-closing device for opening and closing an opening formed in the vehicle in embodiment 2 as the swing proximal end portion is sectioned longitudinally.
Figure 15:
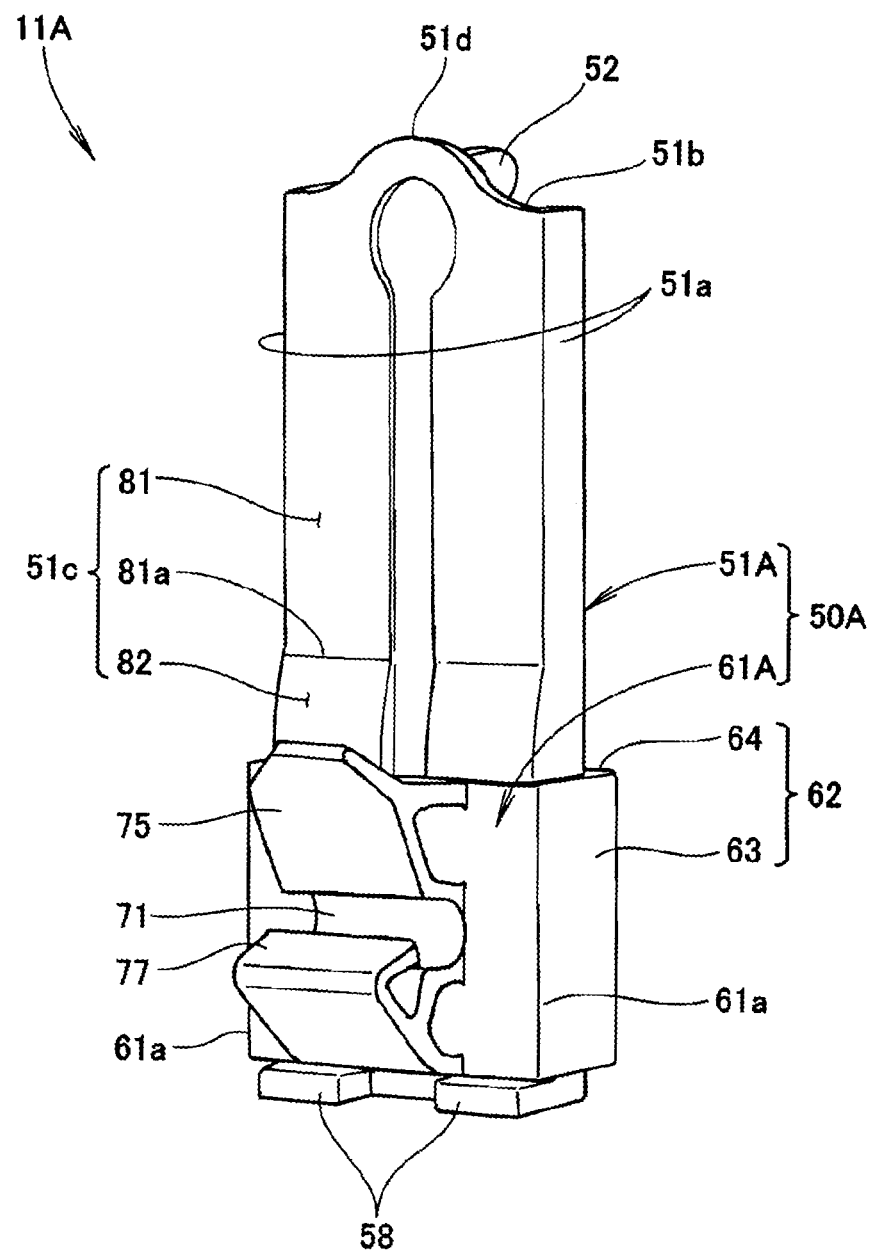
FIG. 15 is a perspective view of a slide mechanism shown in FIG. 14.

FIG. 14 corresponds to FIG. 8. FIG. 16(a) corresponds to FIG. 10. FIG. 16(b) shows a lower end part of the slider 61A as viewed from a back side of the lower end part of the slider 61A. FIG. 17(a) is a view showing back sides of the slide rail section 51A and the slider 61A as the slide rail section 51A and the slider 61A are disassembled from each other.

As shown in FIG. 14 to FIG. 17(a), the slide rail section 51A includes a friction force increasing portion 82 in one part of the region Tet to provide a large friction force between the portion 82 and the slider 61A. The friction force increasing portion 82 is defined by a raised surface on a portion of the front surface 51c of the slide rail section 51A. More specifically, the surface defining the friction force increasing portion 82 is raised in a direction opposite the urging direction Rt (FIG. 4). The friction force increasing portion 82 is hereinafter referred to as "raised surface 82" where appropriate.

More specifically, the front surface 51c of the slide rail section 51A is, as it were, a stepped surface having a reference surface 81, the raised surface 82 located next to the reference surface 81, and an elevated surface 83 located next to the raised surface 82, the surfaces 81 to 83 being arranged in a direction from the upper end 51d to the lower stopper part 58. The reference surface 81, the raised surface 82 and the elevated surface 83 define a continuous surface extending downwardly from above.

The reference surface 81 is the lowest surface providing a reference of the front surface 51c. In other words, the reference surface 81 is a flat surface nearest to the surface 32a of the hinge arm 31L.

The raised surface 82 is an inclining flat surface providing a gently upward slope from a lower end 81a of the reference surface 81 in the downward direction. In other words, the raised surface 82 is the flat surface inclining in a direction away from the surface 32a of the hinge arm 31L. The raised surface 82 is the surface raised in the direction opposite the urging direction Rt (FIG. 4).

The elevated surface 83 (the flat surface 83) is a flat surface extending downwardly from an apex portion 82a of the raised surface 82 to the stopper part 58. That is, the elevated surface 83 on which the slide surface of the slider 61A is slidable is continuous with the apex portion 82a of the raised surface 82 and maintains the same height from the apex portion 82a. zThe elevated surface 83 is parallel to the reference surface 81 which is the other surface of the front surface 51c than the raised surface 82. The back surface 51b of the slide rail section 51A is parallel to the front surface 32a of the arm proximal end portion 32 as the back surface 51b of the slide rail section 51A overlaps the surface front surface 32a of the arm proximal end portion 32. Thus, the reference surface 81 and the elevated surface 83 are parallel to the back surface 51b (including back surfaces of the edges 51a) of the slide rail section 51A as well as to the front surface 32a of the arm proximal end portion 32.

The apex portion 82a of the raised surface 82 and the elevated surface 83 are located higher than the reference surface 81 by a height Hi. The slide rail section 51A has a thickness T1 over the reference surface 81, and a thickness T2 over the apex portion 82a of the raised surface 82 and the elevated surface 83. The thickness T2 is larger than the thickness T1 by the height Hi (T2 =T1+Hi). This means that a raised portion 84 located the height Hi above the reference surface 81 is formed in the slide rail section 51A.

The raised surface 82 begins to incline relative to the reference surface 81 at a point located at the lower end 81a of the reference surface 81. The reference surface 81 has a region Te1 set over a range from the upper end 51d of the slide rail section 51A to the lower end 81a of the reference surface 81. The raised surface 82 has a region Te2 set over a range from the lower end 81a of the reference surface 81 to the apex portion 82a of the raised surface 82. The elevated surface 83 has a region Te3 set over a range from the apex portion 82a of the raised surface 82 to the stopper part 58.

FIGS. 18(a) and (b) show that the slider 61A is located on an upper part of the reference surface 81 of the slide rail section 51A. A lower end surface 61c of the slider 61A is located at a stop position ST shown by a solid line of FIG. 18(a) when the trunk lid 14 (FIG. 2) is fully closed. The stop position ST corresponds to the fully closed position P21 shown in FIG. 4. The lower end 81a of the reference surface 81 (a starting point 81a of the raised surface 82) is adjacent to the stop position ST. That is, the raised surface 82 is adjacent to the stop position ST at which the slider 61A is located when the trunk lid 14 is fully closed.

Figure 19:
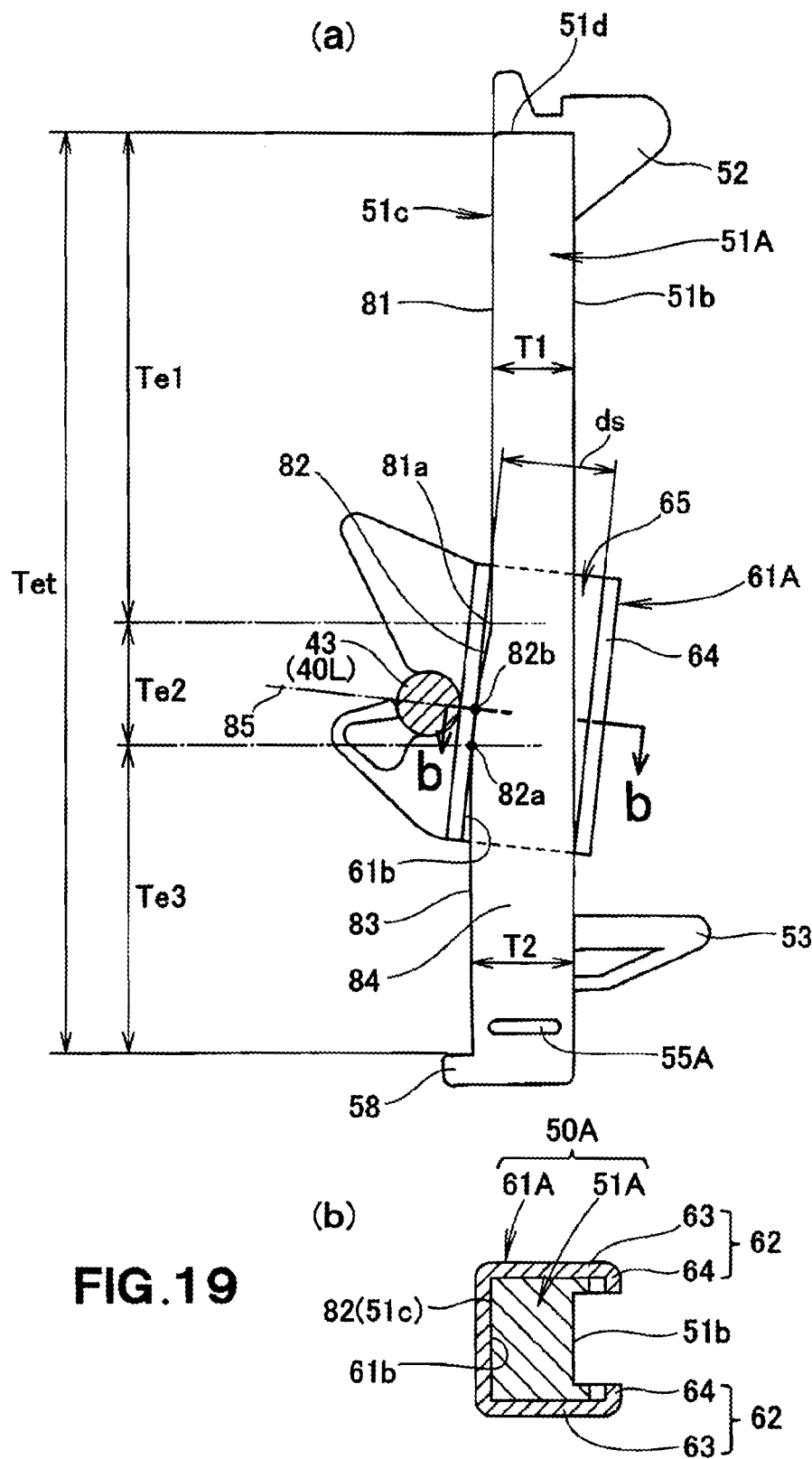
FIG. 19 is a view showing that the slider shown in FIG. 18 has shifted to a raised surface of the slide rail section.
Figure 20:
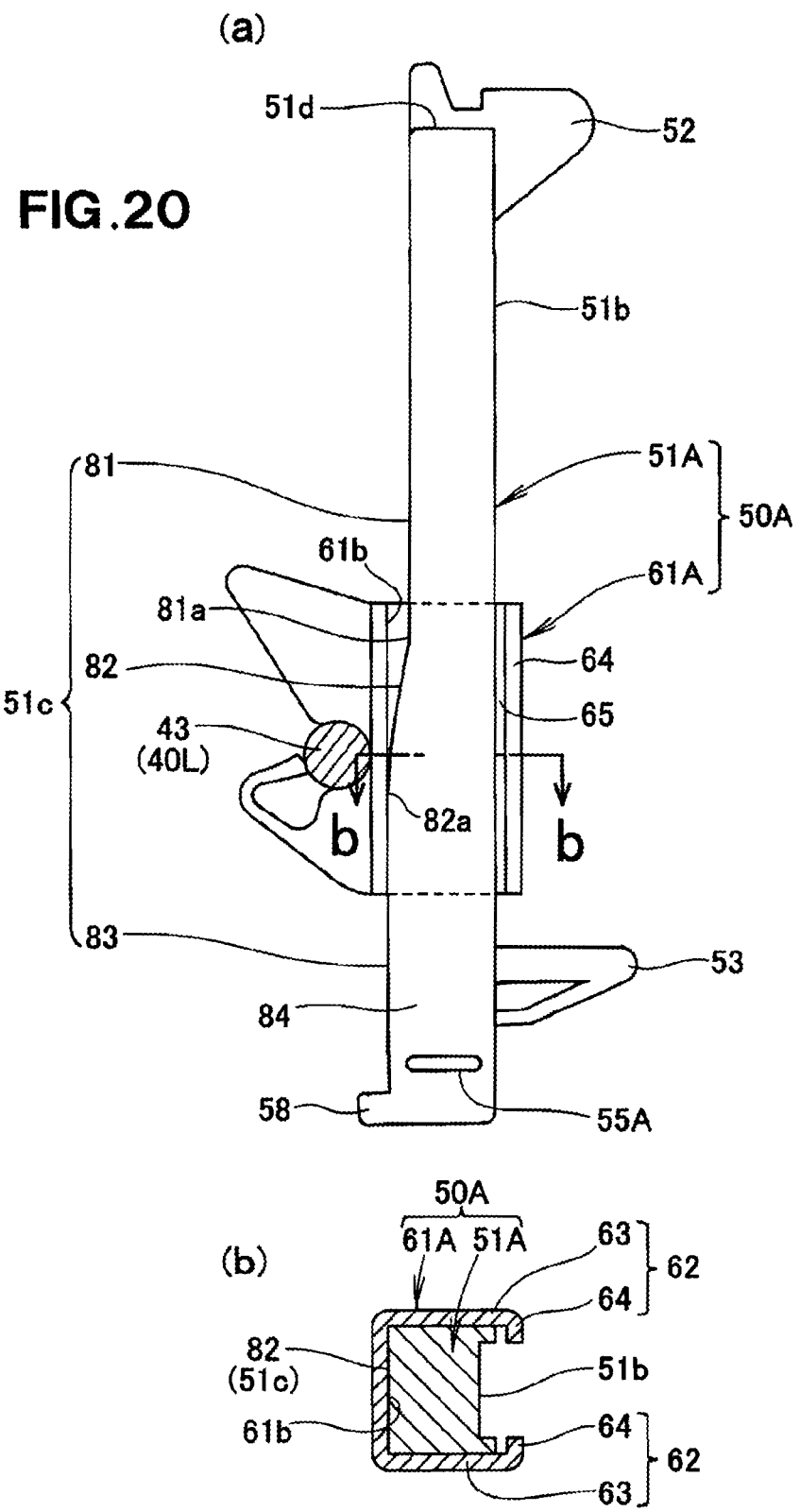
FIG. 20 is a view showing that the slider shown in FIG. 19 has shifted to an elevated surface of the slide rail section.
Figure 21:
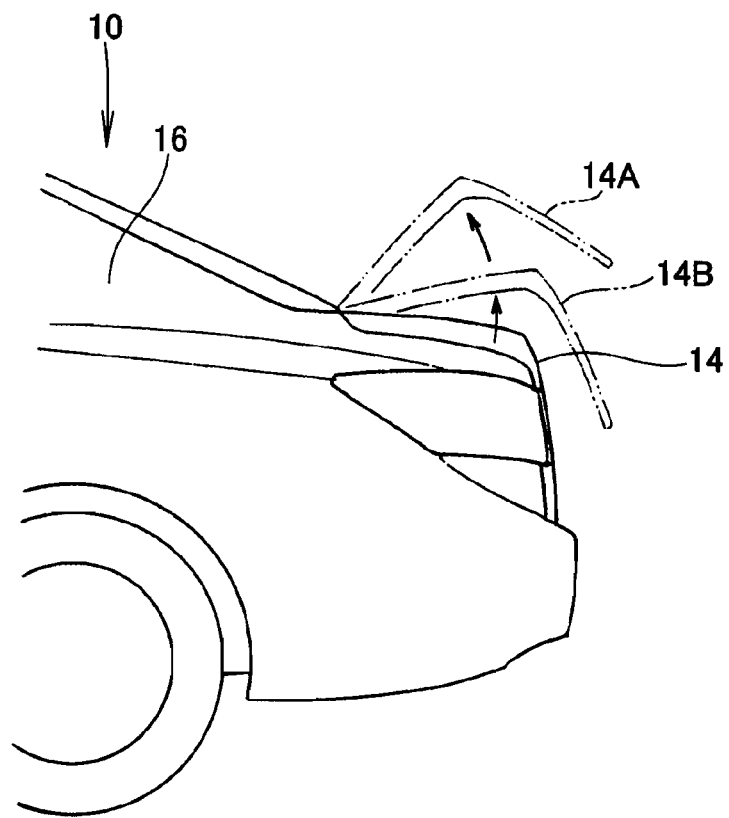
FIG. 21 is a view showing that the trunk lid moves from a closed position to an open position.

After the slider 61A slides downwardly therefrom on the reference surface 81, the slider 61A slides onto the raised surface 82, as shown by a phantom line. This state of the slider 61A is shown in FIG. 19. FIG. 19(a) shows that the slider 61A is located in a location 82b of the raised surface 82 immediately before reaching the apex portion 82a of the raised surface 82. FIG. 19(b) is a cross-sectional view taken along line b-b of FIG. 19(a). As in the embodiment 1 (FIG. 11(c)), an interval ds from the slide surface 61c of the slider 61A to the pair of bent parts 64, 64, i.e., a width ds of each of the pair of slide grooves 65, 65 is set to be larger than a thickness T1 of the slide rail section 51A (the thickness T1 corresponds to the thickness tr in the embodiment 1).

As shown in FIGS. 16(a) and 19(a), the interval ds in the embodiment 2 is sized such that the pair of bent parts 64, 64 of the slider 61A temporarily contacts the back surface 51b of the slide rail section 51A as the slide surface 61b of the slider 61A slides on the raised surface 82 relative to the front surface 51c of the slide rail section 51A. Thus, while the slide surface 61b slides on the raised surface 82, the respective bent parts 64, 64 of the pair of arm portions 62, 62 temporarily contact the back surface 51b of the slide rail section 51A, during which the contact area increases temporarily to thereby increase a friction resistance temporarily.

As shown in FIG. 19(a) and FIG. 19(b), further, the slide surface 61b of the slider 61A has a bar position 85 corresponding to a location to which the opposite end portion 42 of the torsion bar 40L is connected (a location to which the torsion bar 40 is connected). The bar position 85 is set to reach the location 82b immediately before the apex portion 82a of the raised surface 82, when the pair of bent parts 64, 64 temporarily contacts the back surface 51b of the slide rail section 51A. As a result, the friction resistance increases temporarily just before the slide surface 61b slides past the apex portion 82a of the raised surface 82. Immediately after that, the slide surface 61b slides past the apex portion 82a of the raised surface 82, at which time the respective bent parts 64, 64 of the pair of arm portions 62, 62 become out of contact with the back surface 51b of the slide rail section 51A to thereby decrease the friction resistance. As a result, the trunk lid 14 can be opened with a small force.

FIGS. 20(a) and (b) show that the slide surface 61b slides past the apex portion 82a of the raised surface 82. The elevated surface 83 on which the slide surface 61b of the slider 61A is slidable is continuous with the apex portion 82a of the raised surface 82 and maintains the same height from the apex portion 82a. zThe elevated surface 83 is parallel to the other surface 81, i.e., the reference surface 81. For this reason, after the slide surface 61b slides past the apex portion 82a of the raised surface 82, the respective bent parts 64, 64 of the pair of arm portions 62, 62 remain out of contact with the back surface 51b of the slide rail section 51A, thereby maintaining the small friction resistance, such that the trunk lid 14 can be fully opened with a small invariable operating force.

When the fully opened trunk lid 14 begins to be closed, the respective bent parts 64, 64 of the pair of arm portions 62, 62 are out of contact with the back surface 51b of the slide rail section 51A, as shown in FIGS. 20(a) and (b), thereby maintaining the small friction resistance, such that the operating force to begin to close the trunk lid 14 can be small.

Immediately before the trunk lid 14 is fully closed, the respective bent parts 64, 64 of the pair of arm portions 62, 62 are out of contact with the back surface 51b of the slide rail section 51A, as shown in FIG. 18(a) and FIG. 18(b), thereby maintaining the small friction resistance, such that the operating force to finish closing the trunk lid 14 can be small. In addition, a closing load on the trunk opening portion 13 (FIG. 1) immediately before the trunk lid 14 is fully closed can be small and thus the trunk lid 14 can be reliably closed. That is, the trunk lid can shut well.

The front surface 51c of the slide rail section 51A is not even, but formed as a cam surface having an undulation. The slider 61A slides as the slider 61A is guided by the undulation of the cam surface. The friction resistance between the front surface 51c and the slide surface 61b of the slider 61A varies. An operation of opening and closing the trunk lid 14 and the opening/closing load can be optimized.

Figure 16:
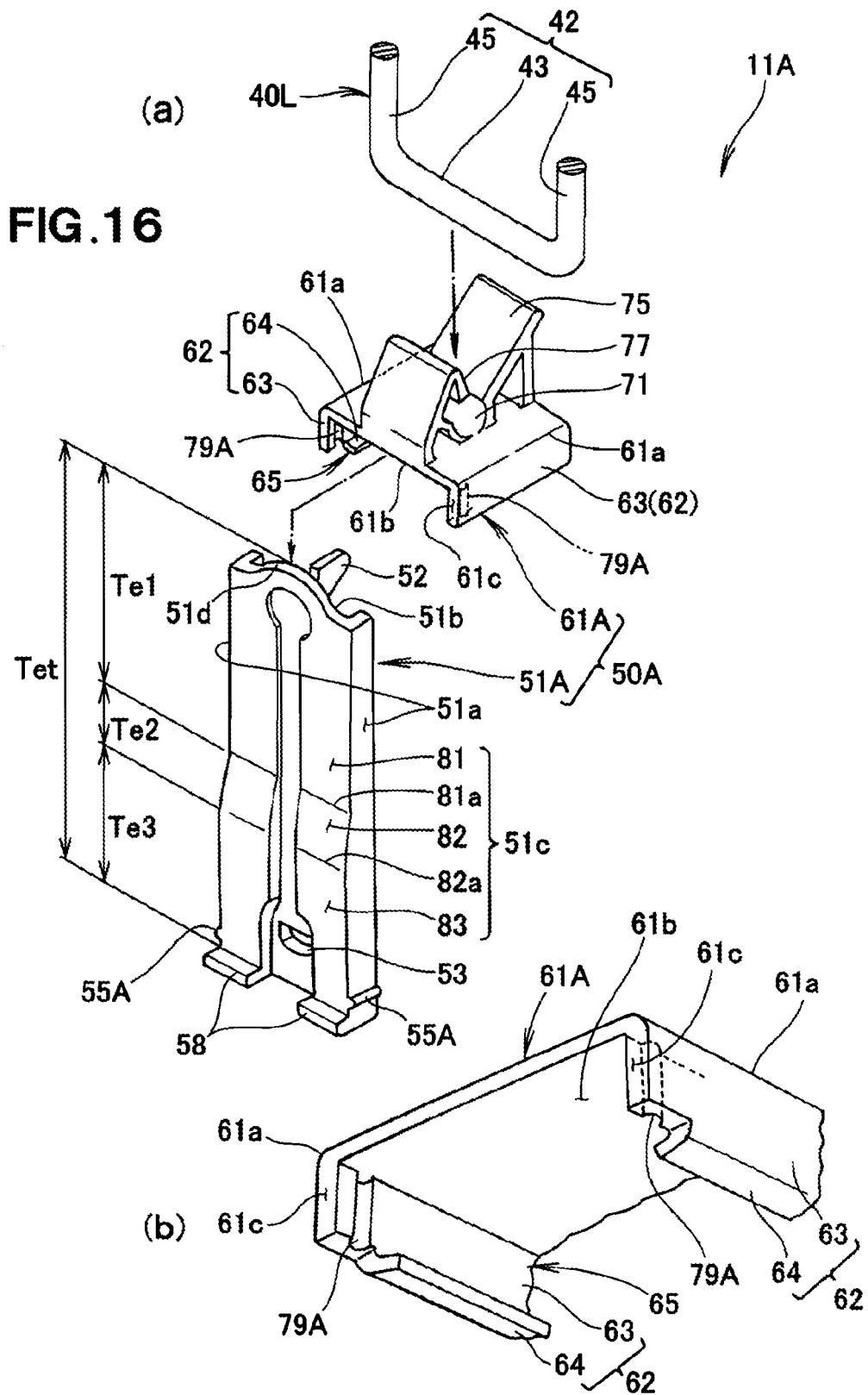
FIG. 16 is a view showing the slide rail section, slider and torsion bar shown in FIG. 14 as they are disassembled from one another.
Figure 17:
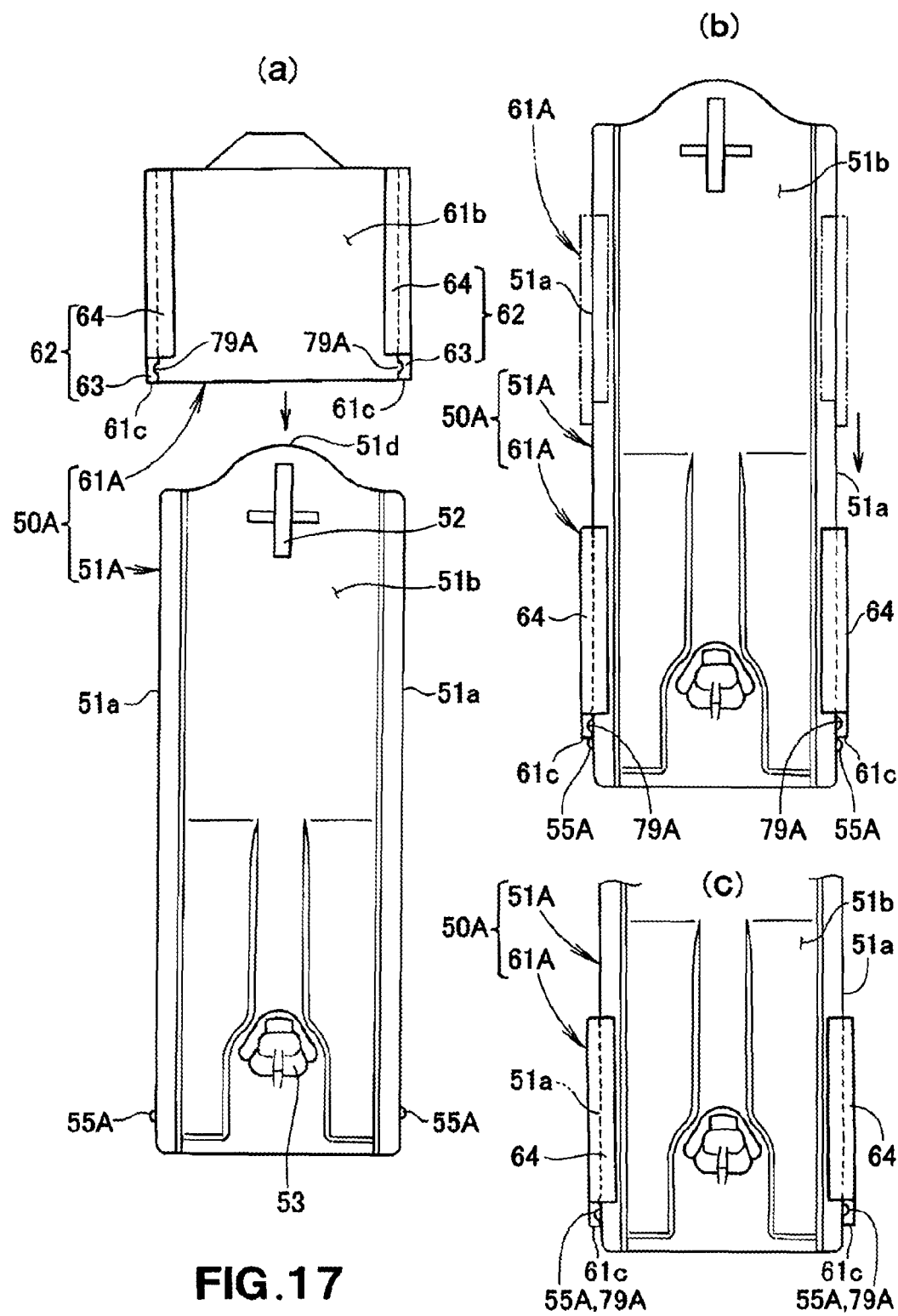
FIG. 17 is a rear elevation view of the slide rail section and slider shown in FIG. 16.
Figure 18:
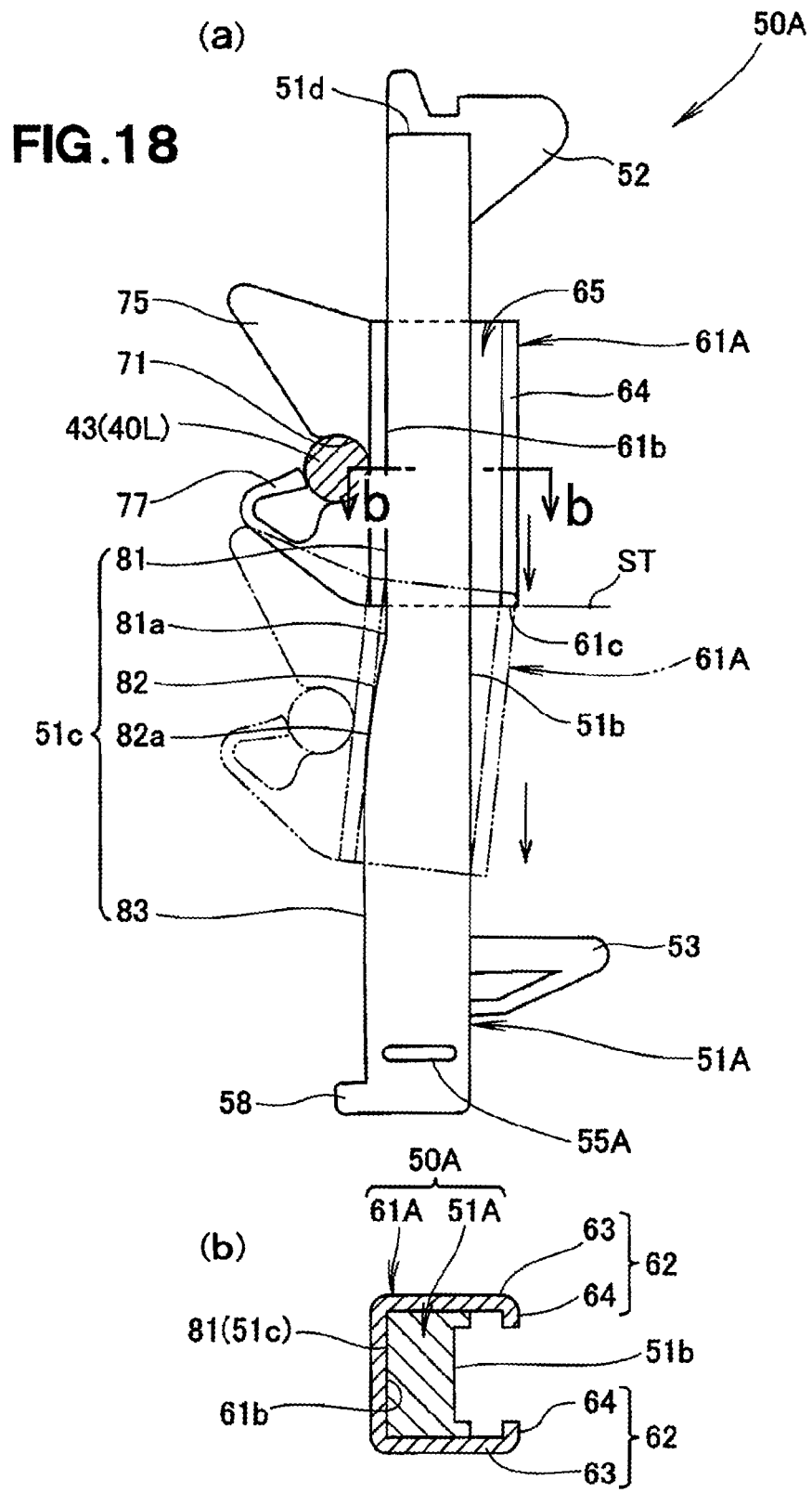
FIG. 18 is a view showing that the slider shown in FIG. 14 is located on a reference surface of the slide rail section.

As shown in FIG. 16 and FIG. 17(a), the slide rail section 51A has a pair of stoppers 55A, 55A. The pair of stoppers 55A, 55A defines the lowest position P24 (FIG. 4) to which the slider 61A can be lowered relative to the slide rail section 51A. The stoppers 55A, 55A are formed integrally with the slide rail section 51A and are provided by a pair of locking projections. The pair of locking projections 55A, 55A (the stoppers 55a, 55A) is formed on the entire thickness of the slide rail section 51A and the each projection 55A is convex arc-shaped in cross-section.

The slider 61A has a pair of recess-shaped locking portions 79A, 79A formed thereon and the locking portions 79A, 79A are lockable to the pair of locking projections 55A, 55A. The locking portions 79A, 79A are recessed in inner surfaces of the extension parts 63, 63 in an opposed relationship with each other. Each of the locking portions 79A, 79A takes the form of an arc-shaped cross-sectional groove elongated in a direction in which each corresponding extension part 63 extends.

FIG. 17(b) shows the slide rail section 51A as viewed in rear elevation with the pair of stoppers 55A, 55A stopping the slider 61A located in a lower part of the slide rail section 51A. The slider 61A shown by a phantom line corresponds to that in a stopped position shown by a solid line of FIG. 18(a). The slider 61A shown by the phantom line of FIG. 17(b) slides downwardly as the slider 61A is guided by the slide rail section 51A. As a result, as shown by a solid line of FIG. 17(b), the lower end surface 61c of the slider 61A abuts on the stoppers 55A, 55A, such that the slider 61A does not move further downwardly relative to the slide rail section 51A.

As discussed above, the slide rail section 51A has the stoppers 55A, 55A defining the lowest position P24 to which the slider 61A can be lowered. The position of the pair of stoppers 55A, 55A corresponds to the lowest position P24 shown in FIG. 4. The slider 61A, which is lowered in response to the swing motion of the arm proximal end portion 32, is retained by the stoppers 55A, 55A in the lowest position P24. For this reason, high quality of assemblage of the slide rail section 51A, the slider 61 and the torsion bar 40L is achieved.

FIG. 17(c) shows the slider 61A located in a lowermost part of the slide rail section 51A to thereby lock the pair of locking portions 79A, 79A to the pair of locking projections 55A, 55A. Since the locking portions 79A, 79A are locked to the locking projections 55A, 55A, the slider 61A is retained on the slide rail section 51A. Thus, the slider 61 can be provisionally assembled to the slide rail section 51A to thereby achieve improved conveyance thereof to a subsequent process.

In the embodiment 2, the same advantageous results as those in the embodiment 1 can be achieved. Additionally, in the embodiment 2, the slide rail section 51A has the friction force increasing portion 82 in one part of the region Tet where the slider 61A is slidable. In the friction force increasing portion 82, a friction force between the slider 61A and the slide rail section 51A increases. A sliding friction force between the slide rail section 51A and the slider 61A as the slider 61A slides on the friction force increasing portion (an increasing location) 82 of the region Tet is larger than a sliding friction force between the slide rail section 51A and the slider 61A as the slider 61A slides on the other portion (a normal location) 81.

The friction force increasing portion 82 can be appropriately easily set to provide the sliding friction force overcoming the urging force of the torsion bar 40L. For example, a size, shape and surface roughness of the friction force increasing portion 82, and whether to provide a lug on the portion 82 can be easily determined. Also, the configuration of the friction force increasing portion 82 is simple, and does not require a part separate from the slide rail section 51A. This prevents increase in the cost for the portion 82.

Just by producing the sliding friction force overcoming a slide load applied by the urging force of the torsion bar 40L, it becomes possible for a human operator to temporarily stop the movement of the hinge arm 31 and trunk lid (the opening-closing member) 14 between the open and closed positions as the hinge arm 31 and the trunk lid 14 are opened to an arbitrary opening degree. Also, in the increasing location, the sliding friction force overcoming the slide load provided by the urging force of the torsion bar 40L prevents non-stop movement of the trunk lid 14 to the fully opened position (shown by a phantom line 14A of FIG. 21) immediately after the trunk lid 14 begins to be opened. That is, the trunk lid 14 can be set in a partly opened position (shown by a phantom line 14B of FIG. 21) without popping up. There is no need for a separate member for preventing the trunk lid from popping up.

The friction force increasing portion 82 is formed by the raised surface 82. More specifically, the raised surface 82 is the portion of the front surface 51c of the slide rail section 51A, the portion being raised in the direction opposite the urging direction of the torsion bar 40L. The sliding friction force is increased by the slide surface 61b of the slider 61A sliding on the raised surface 82 against the urging force of the torsion bar 40L. The structure of the friction force increasing portion 82 is simple.

The pair of slide grooves 65, 65 slidably fits over the opposite edges 51a, 51a of the slide rail section 51A such that the slider 61A does not fall out of the generally flat-plate-shaped slide rail section 51A in a front-to-back direction of the slide rail section 51A, i.e., the urging direction Rt (FIG. 4) or the direction opposite the urging direction.

The width ds of each of the slide groove 65, i.e., the interval ds from the slide surface 61b of the slider to the pair of bent parts 64, 64 is set to be larger than the thickness T2 of the slide rail section. The slider 61A is held always in the surface-to-surface contact with the slide rail section 51A in the urging direction Rt. The respective bent parts 64, 64 of the pair of arm portions 62, 62 do not contact the back surface 51b of the slide rail section 51A when the slide surface 61b of the slider 61A does not slide on the raised surface 82, during which the contact area is small to keep the friction resistance low.

As shown in FIG. 18(a), the raised surface 82 is adjacent to the stop position ST of the slider 61A in which the trunk lid 14 (FIG. 2) is fully closed. Thus, for example when a latch mechanism (not shown) of the trunk lid 14 is unlatched and the trunk lid 14 is brought from the fully closed position to a slightly open position, the raised surface 82 temporarily stops the slider 61A. As a result of the temporary stop of the slider 61A, the trunk lid 14 also temporarily stops. This makes it possible to prevent unwanted opening motion of the trunk lid 14. For example, after the latch mechanism is unlatched, the trunk lid 14 can temporarily stop in an opened position forming a space between the opening portion 13 and the trunk lid 14, such that a human operator brings his hand into the space for further opening the trunk lid 14.

It is understood that the friction force increasing portion 82 in the embodiment 2 is not limited to the raised surface. For example, the front surface 51c of the slide rail section 51A may be evenly flat without having any undulation relative to the reference surface 81, in which case the surface roughness in the range Te2 corresponding to the raised surface 82 varies to form the friction force increasing portion 82. The friction force increasing portion 82 may be formed by lugs provided on the opposite lateral edges (lateral surfaces) of the slide rail section 51A.

INDUSTRIAL APPLICABILITY

The opening-closing devices 11, 11A of the present invention are each suitable for use as a device for opening and closing the trunk lid 14 to open and close the opening portion 13 formed in the rear part of the vehicle body 16.

REFERENCE SIGNS LIST

10 . . . a vehicle, 11, 11A . . . opening-closing devices for an opening portion, 13 . . . an opening portion, 14 . . . an opening-closing member (a trunk lid), 16 . . . a vehicle body, 20L, 20R . . . hinge mechanisms, 21L, 21R . . . hinge brackets, 31L, 31R . . . hinge arms, 32 . . . an arm proximal end portion, 32a . . . a front surface of the arm proximal end portion, 33 . . . a first attachment hole, 34 . . . a second attachment hole, 40L, 40R . . . left and right torsion bars, 41 . . . one end portion of the torsion bar, 42 . . . an opposite end portion of the torsion bar, 43 . . . a pressed part (an urging force applying portion), 50 . . . a slide mechanism, 51 . . . a slide rail section, 51a . . . an edge, 51b . . . a back surface, 51c . . . a front surface, 52 . . . a hook portion, 53 . . . a clip portion, 55A . . . a stopper (a locking projection), 61 . . . a slider 61a . . . an edge, 61b . . . a slide surface, 62 . . . an arm portion, 63 . . . an extension part 64 . . . a bent part, 71 . . . a bar connecting portion (a grooved portion), 72 . . . a central part (a straight groove), 73 . . . opposite end parts (taper grooves), 79, 79A . . . locking portions, 81 . . . another portion (a reference surface), 81a . . . a stopper portion, 82 . . . a friction force increasing portion (a raised surface), 83 . . . a flat surface (an elevated surface), 84 . . . a raised portion, 85 . . . a bar position, ds . . . a size of an interval, P1 . . . a swing center of the arm proximal end portion (a swing center of the hinge arm), P2 . . . a support center of the torsion bar, P22 . . . a position of the slider relative to the slide rail section as the trunk lid is fully opened, P23 . . . a lowest position of the slider, P24 . . . a fully lowered position of the slider, Ro . . . a direction in which the opening-closing member is opened, Rt . . . an urging direction of the torsion bar, SL . . . a slide direction of the slider, ST . . . a stop position, tr . . . a thickness of the slide rail section, α . . . a play

The invention claimed is:

1. An opening-closing device for a vehicular opening portion, the device including an opening-closing member for opening and closing an opening portion formed in a vehicle body, a hinge arm through which the opening-closing member is swingably supported by the vehicle body, and a torsion bar urging the hinge arm in a direction in which the opening-closing member is opened, the device comprising:
   a slide rail section provided on a front surface of the hinge arm; and
   a slider to be guided by the slide rail section to slide in a longitudinal direction of the hinge arm,
   the slider being held always in surface-to-surface contact with the slide rail section in an urging direction of the torsion bar,
   the torsion bar being connected to the slider, and
   the slide rail section having a back surface parallel to the front surface of the hinge arm in an overlapping relation to the front surface, the back surface of the slide rail section being in contact with the front surface of the hinge arm over the substantially entire area thereof and extending continuously in a direction perpendicular to the longitudinal direction of the hinge arm.

2. The device of claim 1, wherein the slider includes a bar connecting opening, the torsion bar being connected to the bar connecting opening by fitting therein, and
   wherein the bar connecting opening is opened in a direction opposite the direction in which the hinge arm is urged by the torsion bar.

3. The device of claim 2, wherein the opening portion is provided by a trunk opening portion provided in a rear part of the vehicle body,
   wherein the opening-closing member is provided by a trunk lid for opening and closing the trunk opening portion,
   wherein the slide rail section is located on a front surface of an arm proximal end portion of the hinge arm, and
   wherein the torsion bar has a support center located rearwardly of a swing center of the hinge arm in a rear direction of the vehicle body.

4. The device of claim 3, wherein the slide rail section has a stopper defining a lowest position to which the slider is capable of being lowered relative to the slide rail section, and wherein the lowest position is set either at a fully lowered position in which the slider is fully lowered in response to a swing motion of the arm proximal end portion, or at a positon offset from the fully lowered position by a play allowing the slider to be further lowered from the fully lowered position.

5. The device of claim 4, wherein the slider is in a position set above the fully lowered position relative to the slide rail section when the trunk lid is fully opened.

6. The device of claim 5, wherein the stopper is provided by a locking projection formed on the slide rail section, and wherein the slider has a locking portion formed thereon, the locking portion being lockable to the locking projection.

7. The device of claim 5, wherein the slider is detachably provided on the slide rail section such that the slider is detachable from a side opposite the stopper.

8. The device of claim 4, wherein the stopper is provided by a locking projection formed on the slide rail section, and wherein the slider has a locking portion formed thereon, the locking portion being lockable to the locking projection.

9. The device of claim 8, wherein the slider is detachably provided on the slide rail section such that the slider is detachable from a side opposite the stopper.

10. The device of claim 4, wherein the slider is detachably provided on the slide rail section such that the slider is detachable from a side opposite the stopper.

11. The device of claim 3, wherein the front surface of the arm proximal end portion has a first attachment hole located towards the swing center of the arm proximal end portion, and a second attachment hole located farther from the swing center than the first attachment hole, and wherein the slide rail section is a member different from the arm proximal end portion in an overlapping relationship with the front surface of the arm proximal end portion, and the slide rail section has a generally L-shaped hook portion engaged with the first attachment hole, and a clip portion locked to the second attachment hole in a snap-fit manner.

12. The device of claim 3, wherein the bar connecting opening is provided by a grooved portion extending in a direction perpendicular to a slide direction in which the slider slides relative to the slide rail section, wherein the grooved portion comprises a central part located at a center in a longitudinal direction of a groove of the grooved portion, and opposite end parts located on opposite sides of the central part in the longitudinal direction of the groove, wherein the central part is in the form of a straight groove parallel to the longitudinal direction of the groove, and wherein the opposite end parts are in the form of taper grooves widening from the central part outwardly in the longitudinal direction of the groove.

13. The device of claim 2, wherein the bar connecting opening is provided by a grooved portion extending in a direction perpendicular to a slide direction in which the slider slides relative to the slide rail section, wherein the grooved portion comprises a central part located at a center in a longitudinal direction of a groove of the grooved portion, and opposite end parts located on opposite sides of the central part in the longitudinal direction of the groove, wherein the central part is in the form of a straight groove parallel to the longitudinal direction of the groove, and wherein the opposite end parts are in the form of taper grooves widening from the central part outwardly in the longitudinal direction of the groove.

14. The device of claim 1, wherein the slider has a slide surface, and the slide rail section has a front surface on which the slide surface is slidable, the slide surface of the slider being held in slidable contact with the front surface of the slide rail section by an urging force of the torsion bar, and wherein the slide rail section has a region where the slider is slidable, the region of the slide rail section has one part defining a friction force increasing portion to increase a friction resistance between the slide rail section and the slider.

15. The device of claim 14, wherein the friction force increasing portion is formed by a raised surface defined by a portion of the front surface of the slide rail section, the portion of the front surface of the slide rail section being raised in a direction opposite the direction of the urging force of the torsion bar.

16. The device of claim 15, wherein the slide rail section is provided by a generally flat member, wherein the slider has a pair of arm portions each generally L-shaped from opposite edges of the slider extending in a direction of slide movement of the slide surface, such that the arm portions embrace edges of the slide rail section, wherein the pair of arm portions comprises a pair of extension parts and a pair of bent parts, the pair of extension parts extending from the slide surface of the slider, near the edges of the slide rail section and toward a back surface of the slide rail section, the pair of bent parts extending from distal ends of the extension parts along the back surface of the slide rail section toward each other, and wherein an interval from the slide surface of the slider to the pair of bent parts is set to be larger than a thickness of the slide rail section.

17. The device of claim 16, wherein the interval is sized such that the pair of bent parts of the slider temporarily contacts the back surface of the slide rail section as the slide surface of the slider slides on the raised surface relative to the front surface of the slide rail section.

18. The device of claim 17, wherein the slide surface of the slider has a bar position corresponding to a location to which the torsion bar is connected, the bar position being set to reach a location located immediately before an apex portion of the raised surface, when the pair of bent parts temporarily contacts the back surface of the slide rail section.

19. The device of claim 18, wherein the apex portion of the raised surface is continuous with a flat surface on which the slide surface of the slider is slidable, the flat surface maintaining the same height from the apex portion, and the front surface of the slide rail section includes a surface other than the raised surface, the flat surface being parallel to the surface other than the raised surface.

20. The device of claim 15, wherein the raised surface is adjacent to a stop position of the slider in which the opening-closing member is fully closed.

* * * * *